(12) United States Patent
Meschter et al.

(45) Date of Patent: Mar. 3, 2020
(10) Patent No.: US 10,576,666 B2

(54) PORTABLE CUSTOMIZATION SYSTEM FOR ARTICLES OF FOOTWEAR

(71) Applicant: NIKE, Inc., Beaverton, OR (US)

(72) Inventors: James C. Meschter, Portland, OR (US); William M. Dieter, Portland, OR (US)

(73) Assignee: NIKE, Inc., Beaverton, OR (US)

(*) Notice: Subject to any disclaimer, the term of this patent is extended or adjusted under 35 U.S.C. 154(b) by 485 days.

(21) Appl. No.: 14/989,910

(22) Filed: Jan. 7, 2016

(65) Prior Publication Data
US 2017/0197340 A1    Jul. 13, 2017

(51) Int. Cl.
| | |
|---|---|
| *A43D 95/10* | (2006.01) |
| *B29C 35/04* | (2006.01) |
| *A43D 95/12* | (2006.01) |
| *B29L 31/50* | (2006.01) |

(52) U.S. Cl.
CPC ............ *B29C 35/049* (2013.01); *A43D 95/10* (2013.01); *A43D 95/12* (2013.01); *B29L 2031/50* (2013.01); *B29L 2031/507* (2013.01)

(58) Field of Classification Search
CPC ...... B29C 35/049; B29D 35/10; A43D 95/10; A43D 3/022; A43D 25/08
See application file for complete search history.

(56) References Cited

U.S. PATENT DOCUMENTS

| | | |
|---|---|---|
| 1,132,645 A | 3/1915 | Andrerson |
| 1,377,809 A | 5/1921 | Crosier |
| 1,540,974 A | 6/1925 | Wilson |
| 1,888,375 A | 11/1932 | Diener |
| 1,697,274 A | 2/1933 | Oswald |
| 2,238,545 A * | 4/1941 | Whiley .................. B65D 71/72 206/139 |
| 2,275,334 A | 3/1942 | Young |
| 2,581,696 A | 1/1952 | O'Reilly |
| 2,771,986 A | 11/1956 | Bekoff |
| 2,817,466 A | 12/1957 | Bonjokian |
| 2,929,082 A | 3/1960 | Schultz |
| 3,007,183 A | 11/1961 | Kamborian et al. |

(Continued)

FOREIGN PATENT DOCUMENTS

| | | |
|---|---|---|
| CN | 200973696 Y | 11/2007 |
| DE | 19825615 C1 | 7/1999 |

(Continued)

OTHER PUBLICATIONS

International Preliminary Report on Patentability (including Written Opinion of the ISA) for Application No. PCT/US2010/049085, dated Mar. 29, 2012.

(Continued)

*Primary Examiner* — Jacob T Minskey
*Assistant Examiner* — Cedrick S Williams
(74) *Attorney, Agent, or Firm* — Banner & Witcoff, Ltd.

(57) ABSTRACT

A steaming system for an article of footwear includes a container with a lid configured to accommodate a steam source. The system also includes provisions for securing the article of footwear such that a majority of the upper is subjected to steam. Articles of footwear may be placed in the steaming system to help customize the articles of apparel for a user's fit and comfort. The steaming system can be configured to be portable and carried by a person.

18 Claims, 26 Drawing Sheets

(56) References Cited

U.S. PATENT DOCUMENTS

| | | |
|---|---|---|
| 3,207,357 A | 9/1965 | Schmitt |
| 3,360,112 A | 12/1967 | Johnson |
| 3,474,476 A | 10/1969 | Forma |
| 3,483,577 A | 12/1969 | Schultz |
| 3,535,418 A | 10/1970 | Daum et al. |
| 3,611,501 A | 10/1971 | Daum et al. |
| 3,720,971 A | 3/1973 | Wyness et al. |
| 3,848,287 A | 11/1974 | Simonsen |
| 4,541,360 A | 9/1985 | Higgins et al. |
| 4,621,384 A | 11/1986 | Walega |
| 4,662,017 A | 5/1987 | Gruber |
| 4,901,390 A | 2/1990 | Daley |
| 4,964,229 A | 10/1990 | Laberge |
| 5,003,708 A | 4/1991 | Daley |
| 5,083,910 A | 1/1992 | Abshire et al. |
| 5,123,180 A | 6/1992 | Nannig et al. |
| 5,193,675 A | 3/1993 | Otis |
| 5,284,632 A | 2/1994 | Kudla et al. |
| 5,509,170 A | 4/1996 | Lofaro et al. |
| 5,692,315 A | 12/1997 | Sham |
| 5,714,098 A | 2/1998 | Potter |
| 5,733,647 A | 3/1998 | Moore, III et al. |
| 5,746,015 A | 5/1998 | Clement et al. |
| 5,797,862 A | 8/1998 | Lamont |
| 5,879,725 A | 3/1999 | Potter |
| 5,882,612 A | 3/1999 | Riley |
| 5,885,622 A | 3/1999 | Daley |
| 5,979,749 A | 11/1999 | Bozich |
| 6,026,595 A | 2/2000 | Curry |
| 6,247,250 B1 | 6/2001 | Hauser |
| 6,345,148 B1 | 2/2002 | Chang |
| 6,346,210 B1 | 2/2002 | Swartz et al. |
| 6,455,084 B2 | 9/2002 | Johns |
| 6,505,742 B2 | 1/2003 | Cagner |
| 6,634,499 B2 | 10/2003 | Allen et al. |
| 6,703,142 B2 | 3/2004 | Snow |
| 7,008,386 B2 | 3/2006 | Alaimo et al. |
| 7,045,190 B2 | 5/2006 | Inagaki et al. |
| 7,257,907 B2 | 8/2007 | Green |
| 7,309,472 B2 | 12/2007 | Michaelson et al. |
| 7,458,173 B2 | 12/2008 | Kielt et al. |
| D584,053 S | 1/2009 | Abdo et al. |
| 7,802,380 B2 | 9/2010 | Riebesell |
| 8,033,393 B2 | 10/2011 | Baker et al. |
| 8,070,006 B2 | 12/2011 | Austin et al. |
| 8,136,190 B2 | 3/2012 | Baker et al. |
| 8,595,877 B2 | 12/2013 | Baker et al. |
| 9,579,685 B2 * | 2/2017 | Starr .................. A23G 3/28 |
| 2002/0050080 A1 | 5/2002 | Vasyli |
| 2002/0195371 A1* | 12/2002 | Brown ............ A47G 23/0641 206/564 |
| 2003/0129089 A1* | 7/2003 | Arnold, Jr. ............ B01L 9/543 422/63 |
| 2004/0031169 A1 | 2/2004 | Jensen et al. |
| 2004/0069149 A1 | 4/2004 | Wakefield |
| 2004/0188285 A1 | 9/2004 | Yoshikawa |
| 2004/0194348 A1 | 10/2004 | Campbell et al. |
| 2004/0194352 A1 | 10/2004 | Campbell et al. |
| 2005/0262757 A1* | 12/2005 | Wong .................. A61F 7/034 44/250 |
| 2006/0049181 A1* | 3/2006 | Tuhkru ................ A43B 9/00 219/678 |
| 2007/0039840 A1 | 2/2007 | Mu et al. |
| 2008/0034616 A1 | 2/2008 | Rhenter |
| 2008/0087563 A1 | 4/2008 | Kim |
| 2008/0093257 A1 | 4/2008 | Kim |
| 2009/0044426 A1 | 2/2009 | Levine |
| 2011/0068024 A1* | 3/2011 | Baker .................. A43D 95/12 220/212 |
| 2011/0266173 A1 | 11/2011 | Baker et al. |
| 2012/0077136 A1 | 3/2012 | Baker et al. |
| 2013/0322859 A1 | 12/2013 | Baker et al. |
| 2015/0175343 A1 | 6/2015 | Baker et al. |

FOREIGN PATENT DOCUMENTS

| | | |
|---|---|---|
| DE | 10120089 A1 | 10/2002 |
| FR | 2564428 A3 | 11/1985 |
| FR | 2685292 | 6/1993 |
| GB | 2034281 | 6/1980 |
| GB | 2124592 | 2/1984 |
| GB | 2344046 A | 5/2000 |
| JP | 10014742 | 1/1998 |
| JP | 2005021647 A | 1/2005 |
| KR | 20080001508 | 6/2008 |
| SU | 389776 A1 | 7/1973 |

OTHER PUBLICATIONS

International Search Report and Written Opinion for Application No. PCT/US2010/049085, dated May 9, 2011.

Invitation to Pay Additional Fees and Where Applicable Protest Fee for Application No. PCT/US2010/049085, dated Feb. 22, 2011.

\* cited by examiner

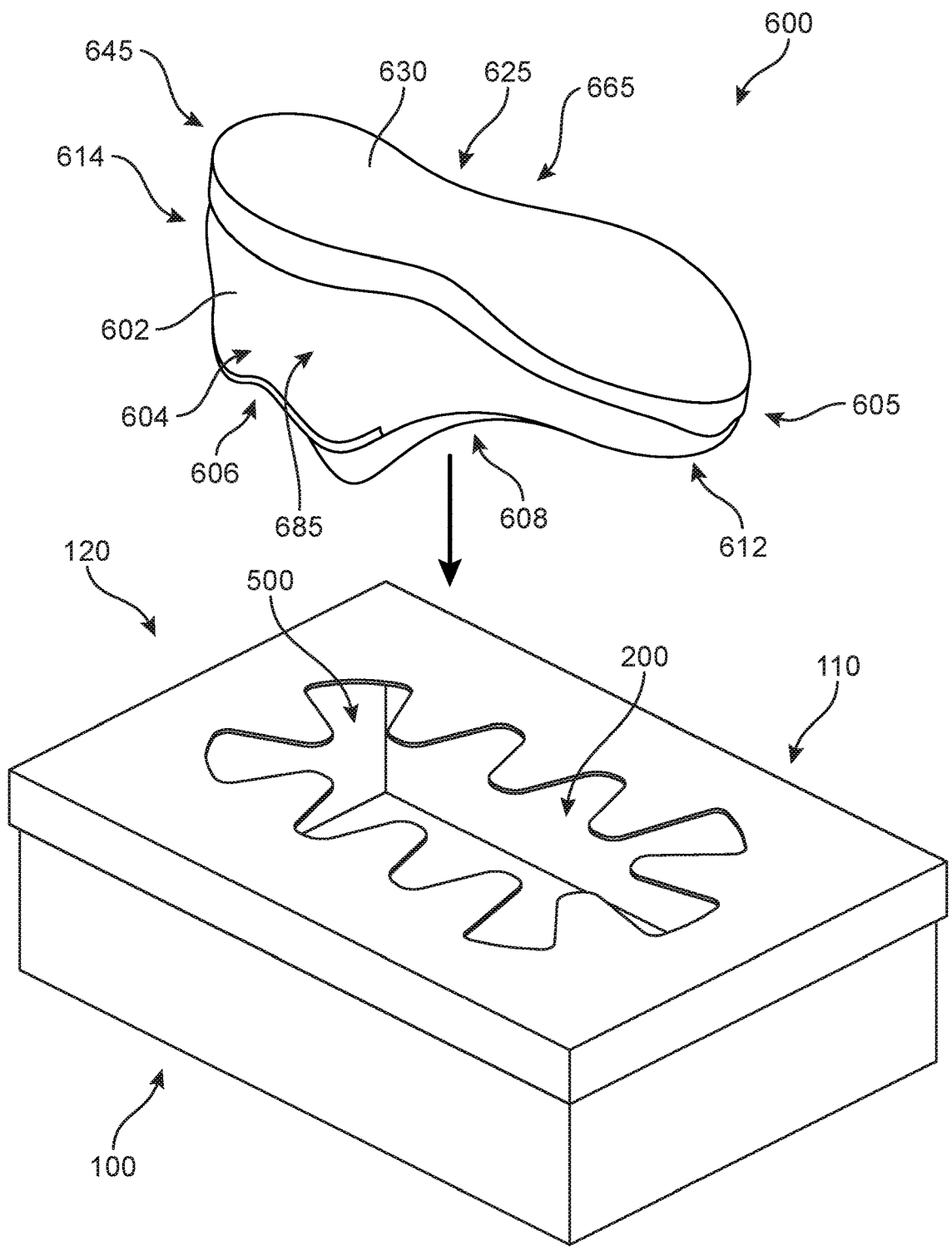
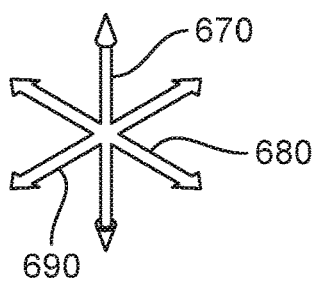
FIG. 6

PORTABLE CUSTOMIZATION SYSTEM FOR ARTICLES OF FOOTWEAR

BACKGROUND

The present embodiments relate to an apparatus and method of custom fitting articles, and in particular to a post-manufacturing customization system and method of custom fitting an article of footwear through the application of steam.

Steam can be used to soften articles of apparel. Articles of footwear often include an upper and a sole structure. The upper comprises many different components, including various layers, sections, or segments of material. These components may be made from stock textile materials such as fabrics and leather goods that may be customized for a user.

SUMMARY

In one aspect, the present disclosure is directed to a steaming apparatus for an article of footwear with an upper and a sole structure, the steaming apparatus comprising a container and a lid, where the lid is sized and dimensioned to fit onto the container for holding the article of footwear. The lid includes a removable area sized and dimensioned to receive a substantial majority of the upper from a forefoot portion to a heel portion of the upper. Furthermore, the removable area is configured to be fully removed from the lid so as to form an aperture in the lid. An outer perimeter of the aperture is defined by a plurality of flanges, wherein the plurality of flanges are configured to securely hold the article of footwear in an inverted position.

In another aspect, the present disclosure is directed to a customization kit for an article of footwear, the customization kit including a container, a lid, and an article of footwear. The lid is sized and dimensioned to fit onto the container, and the container is sized and dimensioned to store at least one article of footwear. The container and the lid form a chamber, and an interior surface of the chamber is substantially steam resistant. The chamber is configured to accommodate a heat source when the lid is fitted on the container. Furthermore, the article of footwear includes a forefoot portion, a midfoot portion, and a heel portion, as well as an upper and a sole structure. The upper includes an insertable portion, where the insertable portion extends from the forefoot region to the heel region of the upper. The lid includes a removable area sized and dimensioned to receive the insertable portion of the upper, and the removable area is configured to be fully removed from the lid so as to form an aperture in the lid.

In another aspect, the present disclosure is directed to a method of using a steaming apparatus for steaming an article of footwear, the steaming apparatus including a container and a lid, and the lid being sized and dimensioned to fit onto the container, the article of footwear comprising an upper and a sole structure, and the article of footwear including a forefoot portion, a midfoot portion, a heel portion. The method comprises placing a source of steam within a chamber, the chamber being defined by an interior of the container and the lid, and forming an aperture within the lid by removing a removable portion of material from a center of the lid, the aperture being sized and dimensioned to receive a substantial majority of the upper of the article of footwear, where an outer perimeter of the aperture is sized and dimensioned to contact the upper along the forefoot portion, midfoot portion, and heel portion. The method also includes inserting the upper of the article of footwear into the aperture in an inverted position, where the aperture is configured to hold in place the upper of the article of footwear in the inverted position within the aperture, and where at least a collar portion, a throat opening, and a vamp portion of the upper are disposed within the chamber formed by the container and the lid when the article of footwear is in the inverted portion within the aperture.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 6 is a schematic isometric view of an embodiment of a steaming system with an article of footwear;

DETAILED DESCRIPTION

Figure 1:
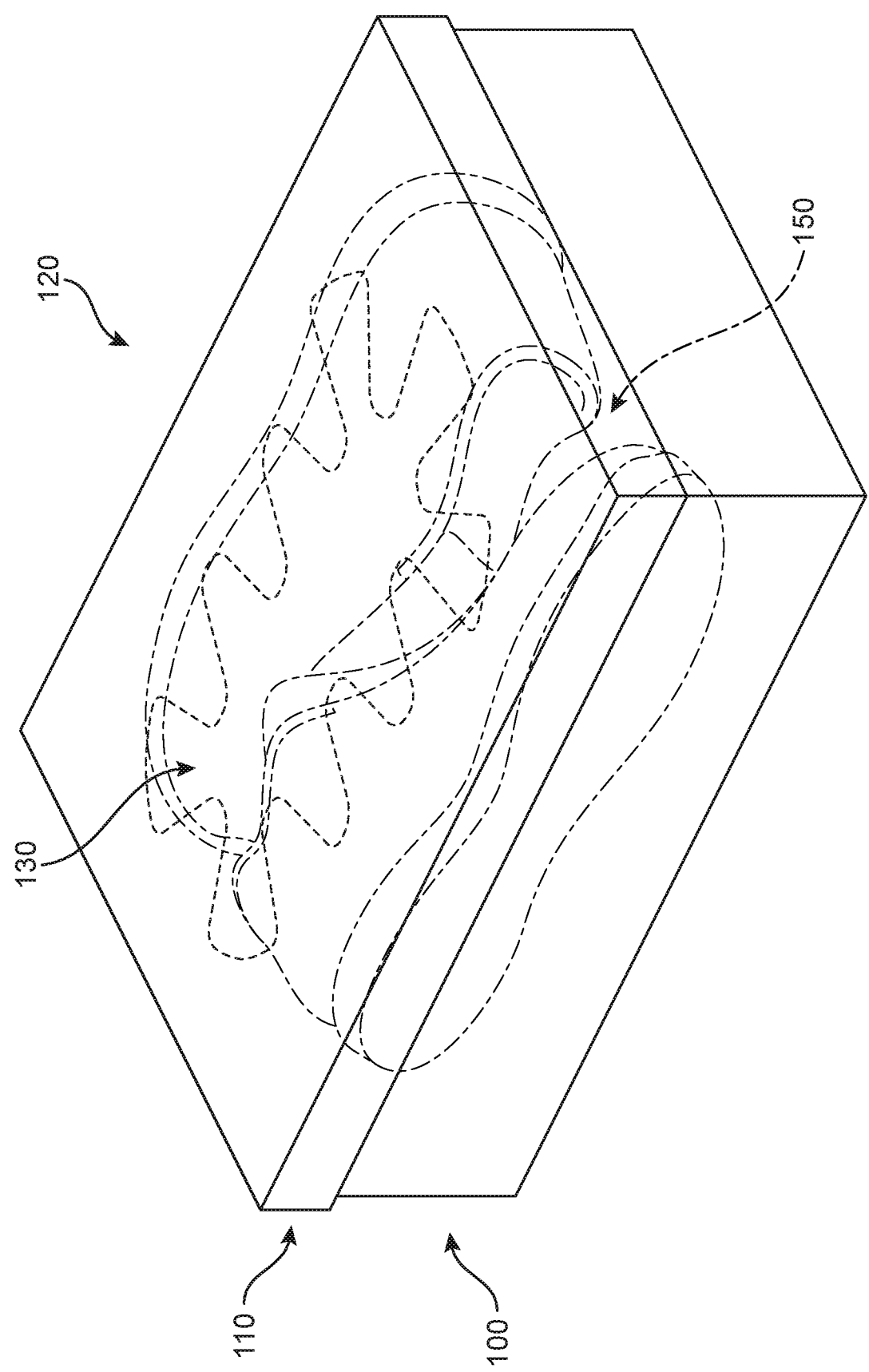
FIG. 1 is a schematic isometric view of an embodiment of a steaming system in its closed configuration.
Figure 2:
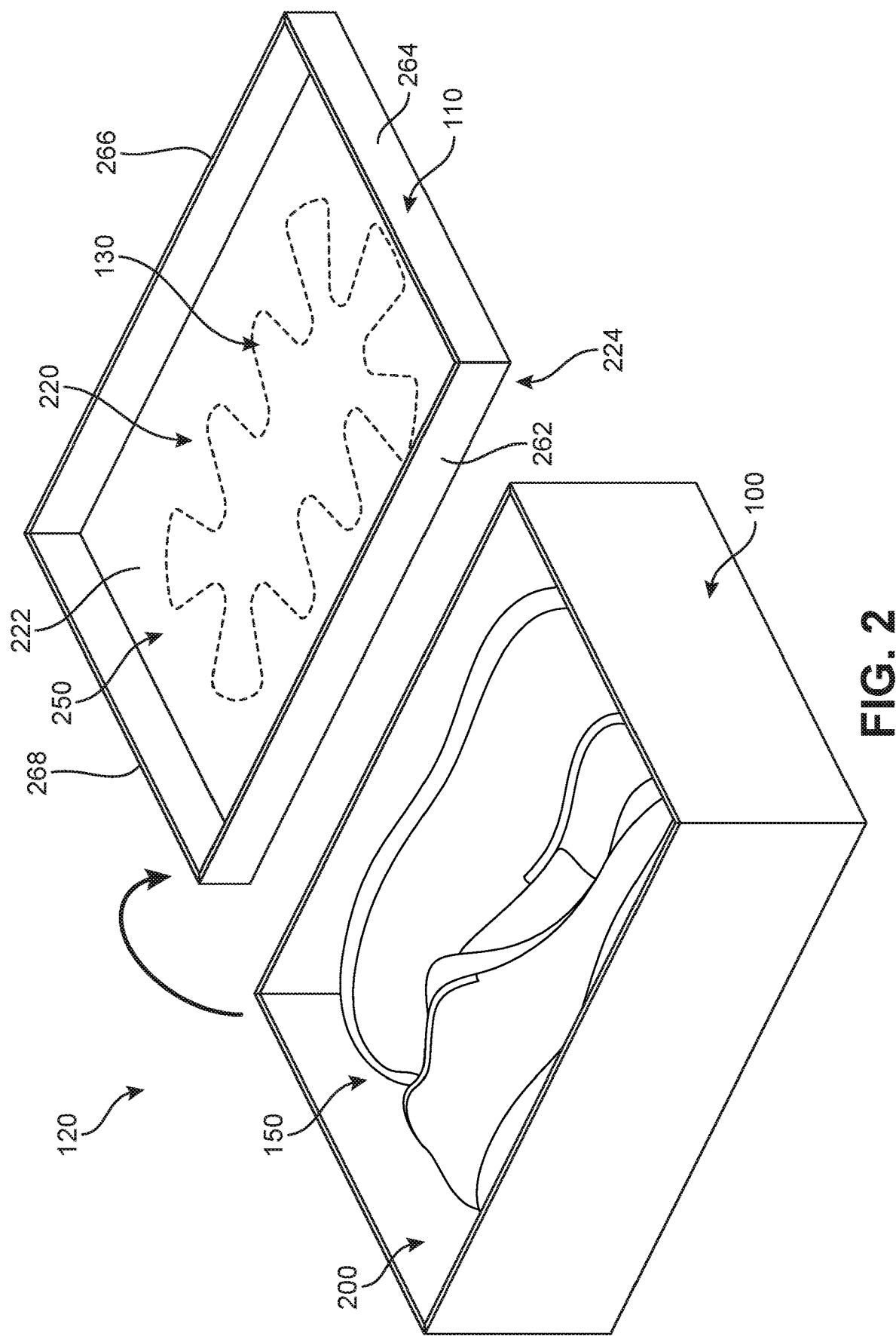
FIG. 2 is a schematic isometric view of an embodiment of a steaming system as it is opened.

Generally, a post-manufacturing customization system and method of custom fitting an article of footwear may be configured by providing a customer with an apparatus for steaming an article of footwear. FIGS. 1 and 2 depict a view of an embodiment of a steaming apparatus 120. Steaming apparatus 120 includes a container 100 with a lid 110 that is configured to receive an article of footwear. FIG. 1 shows container 100 with a pair of footwear 150, depicted in dotted lines, disposed within the interior of container 100. FIG. 2 shows container 100 with lid 110 removed to reveal pair of footwear 150 that is disposed within container 100.

In some embodiments, an article of footwear may be a shoe. However, in other embodiments, the article of footwear could be any type of footwear, including, but not limited to, basketball shoes, hiking boots, soccer shoes, football shoes, low-top shoes, sneakers, running shoes, cross-training shoes, rugby shoes, baseball shoes as well as other kinds of shoes. Moreover, in some embodiments, the provisions discussed herein for an article of footwear could be incorporated into various other kinds of non-sports-related footwear, including, but not limited to, slippers, sandals, boots, high-heeled footwear, and loafers. Additionally, while a single article of footwear is shown in later figures, it should be understood that the same principles taught in this detailed description could be applied to a second, complementary article of footwear.

The term "container" as used throughout this detailed description and in the claims refers to any housing, enclosure, container, or other structure that can be configured to store one or more articles. Moreover, as used herein, "portable container" refers to any housing, enclosure, container, or other structure that may be moved from one location to another. Specifically, a portable container may be any container that is not required to be permanently secured or fixedly attached to a surface in order to operate, and is capable of being readily displaced by a single individual. The shape of the container can vary in different embodiments. In some cases, the container may have a substantially box-like shape. In other cases, a container may have an approximately cuboid or rectangular prism shape. Examples of other shapes for a container include, but are not limited to, curved or rounded shapes, polygonal shapes, regular shapes, irregular shapes as well as any other kinds of shapes. In some cases, a container and lid may include a structure that allows the apparatus to stand or be otherwise independently stable when placed on a surface (e.g., without additional supportive components or mounting elements).

The materials comprising the various portions of steaming apparatus 120 may vary in different embodiments. In some embodiments, one or more areas of container 100 and/or lid 110 may include thermal or heat-insulating materials, such as fibrous insulations, glass, silica, rock wool, alumina silica, mineral wool, cellular insulations, elastomer, polyolefin, polyurethane, granular insulations, or other types of insulation material known in the art. Furthermore, other components of steaming apparatus 120 may comprise other materials. Examples of different materials that could be used include, but are not limited to; metallic materials, polymer materials including plastics and/or rubbers, wooden materials, composite materials, steam-resistant materials, plastic, glass, PVC, polypropelyne as well as any other kinds of materials. Furthermore, portions of the steaming apparatus may be made of various generally flexible or inflexible materials. For example, lid 110 can comprise a silicone rubber insulation, natural rubber or other type of synthetic or plastic insulation coating. In some embodiments, materials comprising container 100 and/or lid 110 may be substantially waterproof, water resistant, steam resistant, and/or substantially impermeable to steam and other gas or fluids.

In different embodiments, container 100 and lid 110 may comprise a shoebox. For purposes of this disclosure, a shoebox can comprise of a four-sided structure with a bottom portion, where the bottom portion is joined to the four-sided structure and forms a box. The shoebox includes a lid that can be used to cover the top opening and form a substantially closed six-sided structure with an interior chamber. The shoebox structure can enclose or hold articles of footwear placed within the interior chamber. Thus, in some embodiments, container 100 can be a shoebox that is sized and dimensioned to hold a pair of footwear. In one embodiment, container 100 may be a shoebox that is sized and dimensioned to hold a single article of footwear. In the embodiment of FIG. 2, container 100 includes a chamber 210 configured to hold pair of footwear 150. It should be understood that the following figures are for purposes of illustration only, and each of the components described herein may be included or referred to in the description while not illustrated in the figures.

Steaming apparatus 120 may include provisions for sealing or otherwise enclosing container 100. In some embodiments, lid 110 may provide a means of fully covering container 100 and facilitating the closed configuration as shown in FIG. 1. In one embodiment, as lid 110 is lowered onto container 100, lid 110 may be substantially level or even with the outer surface of container 100, such that the majority of steaming apparatus 120 provides a substantially smooth outer surface when in the closed configuration.

In some cases, the apparatus can comprise a box with a detachable lid. In other cases, the apparatus can comprise a box-like container with a hinged lid or a lid that is otherwise fixedly attached to the box along at least one portion of the lid. In the illustrated embodiments, container 100 includes lid 110 that is detachable and may be fully removed from container 100. As shown in FIG. 2, a center portion 220 of lid 110 may comprise an inner side 222 and an outer side 224.

In addition, center portion 220 may be bounded or framed by one or more panels in some embodiments. In one embodiment, a two-, three-, or four-sided structure may be formed around center portion 220 through the inclusion of the panels. In some cases, center portion 220 is bounded by four adjacent panels, including a first panel 262, a second panel 264, a third panel 266, and a fourth panel 268.

In different embodiments, each panel may be joined or attached to another panel along one or more edges. Furthermore, each panel may be joined or attached to one edge of center portion 220 in some embodiments. Panels joined to center portion 220 may form a raised or "walled" perimeter along at least a portion of center portion 220 in some embodiments. In FIG. 2, it can be seen that first panel 262, second panel 264, third panel 266, and fourth panel 268 form a raised, substantially continuous boundary around inner side 222 of center portion 220 of lid 110. In other words, inner side 222 may be recessed with respect to the panels bordering center portion 220 in some embodiments. The depth of recess 250 may vary in different embodiments. In some cases, the depth may be consistent throughout lid 110 or vary in one region relative to another region of lid 110. In some embodiments, recess 250 that is associated with lid 110 may be used to help stabilize lid 110 when lid 110 is joined to container 100.

Thus, in one embodiment, lid 110 is rectilinear with one or more panel walls that extend upwardly from center portion 220. In some embodiments, the outer dimensions of the sidewalls of container 100 are such that they will fit snugly into recess 250 of lid 110 formed by the outer edges of each of the panels. In other words, lid 110 and container 100 can be configured to nest together in one embodiment. In other embodiments, other securing mechanisms may be used to securely position lid 110 with container 100.

In other embodiments, center portion 220 may have fewer or greater panels, or panels of different relative dimensions than those illustrated here. In other embodiments, center portion 220 may adjoin ridges, tabs, hinges, slots, and/or other securing features. Furthermore, in one embodiment, center portion 220 may not include any panels, such that lid 110 is substantially flat throughout. Lid 110 will be discussed further below with respect to FIGS. 3-5.

In some embodiments, steaming apparatus 120 can include lid 110 that is provided with a predetermined removable area ("removable area") 130 (see FIG. 1). The predetermined removable area may be provided on the container lid in any location. In some embodiments, removable area 130 is located along center portion 220. However, in other embodiments, at least a portion of removable area 130 may extend onto one or more panels.

In some embodiments, removable area 130 may vary in size. In some cases, removable area 130 may comprise a majority of the area that comprises lid 110. While lid 110 may have a first surface area size that encompasses removable area 130, removable area 130 may have a second surface area size that is at least one-third the size of the first surface area in some embodiments. In one embodiment, the second surface area of removable area 130 may comprise at least half the size of the first surface area of lid 110. Thus, removable area 130 may represent a substantial segment or proportion of lid 110 in some cases.

Figure 3:
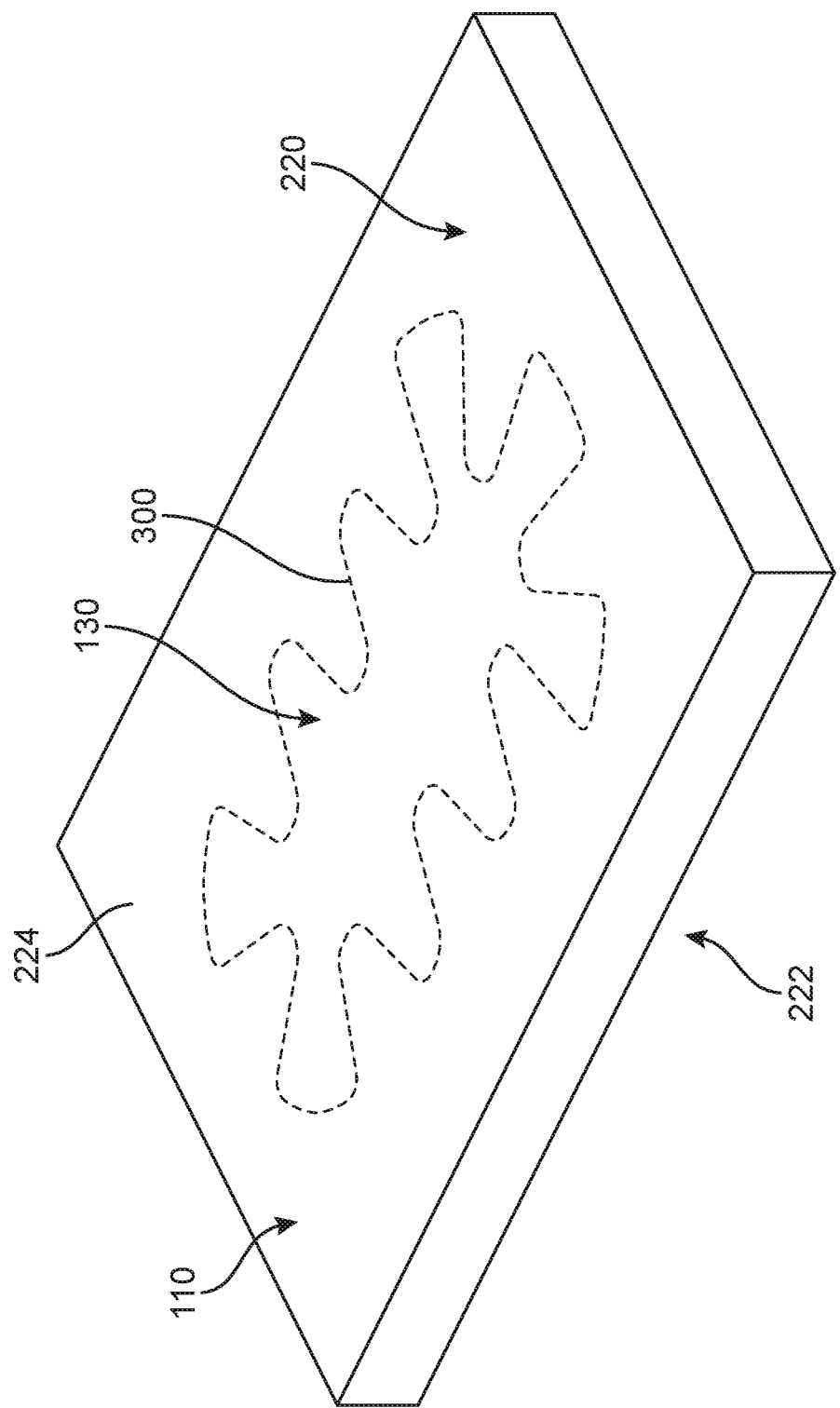
FIG. 3 is a schematic isometric view of an embodiment of a lid for a steaming system.
Figure 4:
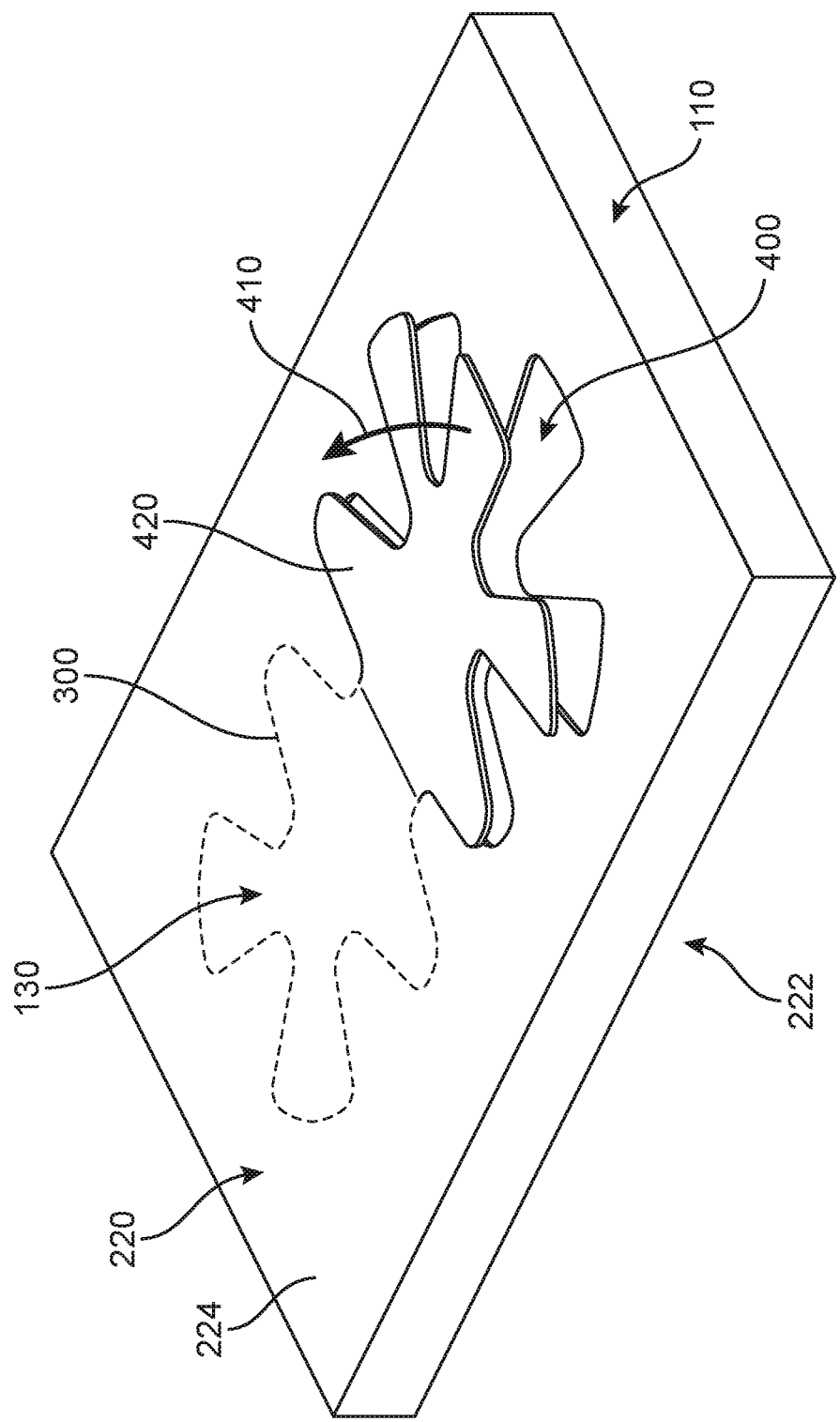
FIG. 4 is a schematic isometric view of an embodiment of a lid for a steaming system.

Referring to FIGS. 3-4, removable area 130 can comprise an outer perimeter 300. As shown in FIG. 4, an aperture 400 may be formed by the removal of at least a portion of removable area 130 along the edges associated with outer perimeter 300. As illustrated in FIG. 4, a first portion 420 of removable area 130 is in the process of being partially separated from lid 110. In some cases, removable area 130 may be perforated. In other cases, removable area 130 may be scored on one side. In other embodiments, removable area 130 may be marked on either side of a container lid by dotted or dashed lines for removal by a customer.

In one embodiment, removable area 130 may be made removable by applying a force 410 to "punch out" or pull the removable area along outer perimeter 300. However, in other embodiments, removable area 130 may be removed by cutting or slicing along the region of lid 110 associated with outer perimeter 300. In some embodiments, removable area 130 may be removed through the application of a force along either inner side 222 or outer side 224. In other embodiments, removable area 130 may only be removed from one side. In addition, in some embodiments, there may be a small tab or lift-out portion formed in lid 110. In some cases, the tab can be partially punched out of lid 110 along a perforation line so that it can be punched out separately and used as a finger grip to help facilitate the removal of removable area 130. In other embodiments, a removable area may consist of multiple removable segments. For example, there may be additional perforations formed within center portion 220 that allow the removable area to comprise of multiple portions that may be removed individually.

Figure 5:
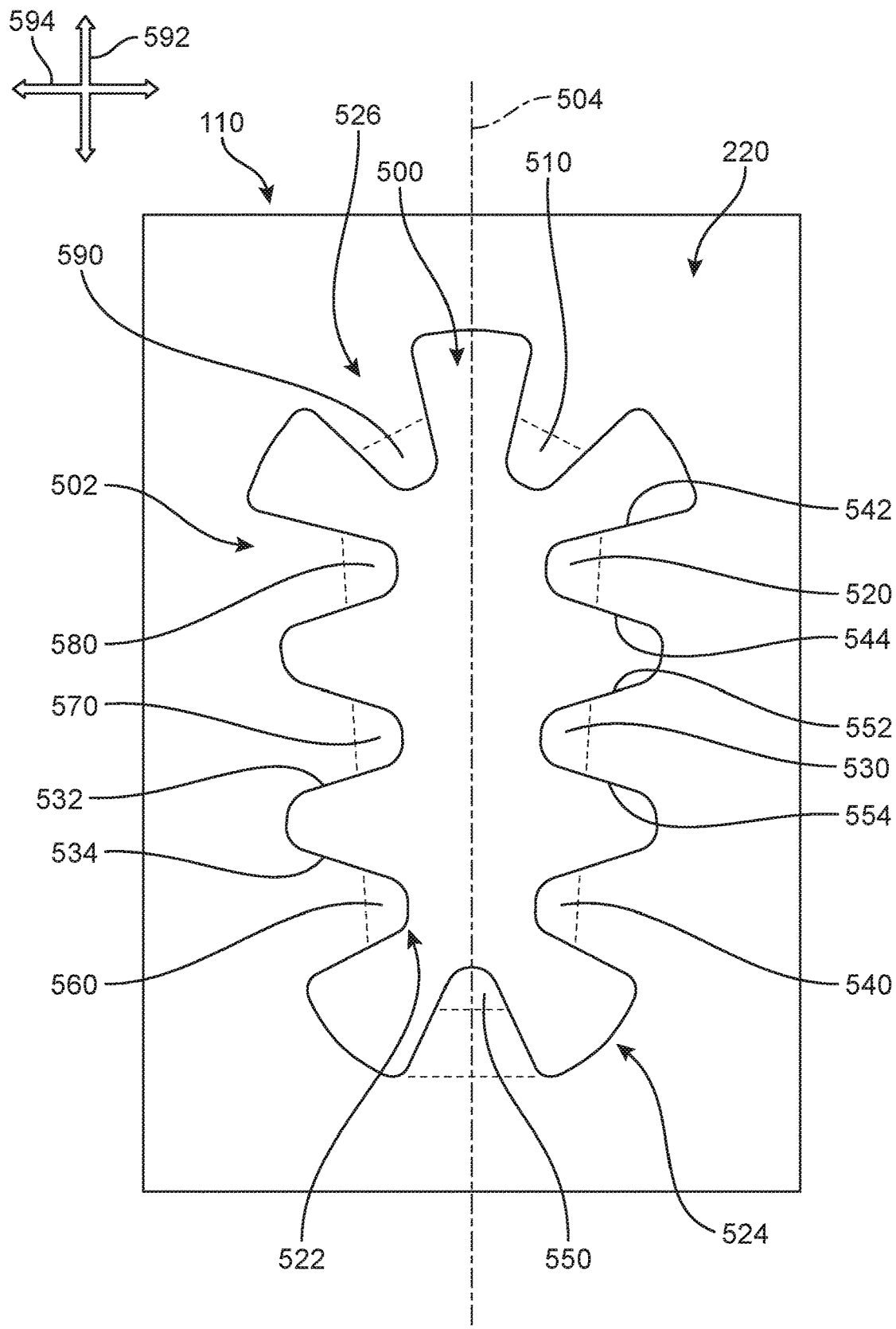
FIG. 5 is a schematic bottom-up view of an embodiment of a lid for a steaming system.

In the top-down view of FIG. 5, the removable area (as shown in FIG. 4) has been fully removed from lid 110, forming a receiving aperture 500. Receiving aperture 500 may be substantially similar in size and shape to the removable area in some embodiments. In some embodiments, receiving aperture 500 may be a space formed in center portion 220 that is sized and dimensioned to fit, secure, or receive a portion of an article of footwear.

In some other embodiments, removable area and the resulting receiving aperture 500 may be of a size and dimension to receive a portion of a specific type of article of footwear. In other embodiments, receiving aperture 500 can be sized and dimensioned to receive a portion of multiple types of article of footwear. Thus, in some embodiments, the geometry, dimensions, and/or position of receiving aperture 500 may vary.

In some embodiments, the overall shape of receiving aperture 500 (i.e., the shape associated with the outer perimeter of receiving aperture 500) may be either regular or irregular. In FIG. 5, receiving aperture 500 comprises a multi-armed shape, defined in part by one or more flange portions ("flanges") 502 formed in lid 110. In FIG. 5, there are nine flanges 502, including a first flange 510, a second flange 520, a third flange 530, a fourth flange 540, a fifth flange 550, a sixth flange 560, a seventh flange 570, an eighth flange 580, and a ninth flange 590. Each flange portion can have different shapes or sizes in different embodiments. In some embodiments, a flange portion can include a partially rectangular, triangular, tab, round, elliptical, square, or other regular or irregular shape. In FIG. 5, each flange portion comprises a generally curved and tapered three-sided shape. In one embodiment, a flange portion may comprise a generally rounded triangular shape, including a base 526, a first side 532, and a second side 534. Base 526 is continuous with the remainder of center portion 220, while first side 532 and second side 534 extend inward, meeting at a rounded tip 522. Each flange portion is spaced apart from adjacent flange portions on either side of the flange portion by slightly curved outer edges 524.

Furthermore, in the view of FIG. 5, each tab is illustrated with a series of dotted lines to represent regions where bending of the flanges may occur. However, it should be understood that these dotted lines are for illustration only, and there may be no particular axis or region of bending associated with any of the flanges in some embodiments. Flanges may bend along various regions in different embodiments. In addition, any deformation of a flange that occurs need not be linear or occur in the same place during each use of the steaming apparatus. In FIG. 5, the dotted lines are provided only for the convenience of the reader in understanding some of the disclosed embodiments.

In some embodiments, the shape of receiving aperture 500 can be symmetrical about one or more axes. In one embodiment, receiving aperture 500 can be symmetrical about a longitudinal axis 592 or a lateral axis 594. In FIG. 5, the shape of receiving aperture 500 is substantially symmetrical about longitudinal midline 504. In some embodiments, there may be flanges 502 formed in center portion 220 of lid 110 that are arranged in various configurations. In one embodiment, flanges 502 may generally extend or be oriented inward toward a center of receiving aperture 500. In other words, rounded tip 522 of each flange may be directed toward a center point or generally face toward longitudinal midline 504. In the arrangement of flanges 502 illustrated in FIG. 5, second flange 520, third flange 530, fourth flange 540, sixth flange 560, seventh flange 570, and eighth flange 580 are generally oriented toward longitudinal midline 504. Furthermore, first flange 510 and ninth flange 590 are oriented diagonally toward longitudinal midline 504. In addition, fifth flange 550 is oriented such that it extends directly upward, generally parallel with longitudinal midline 504. Thus, each flange is disposed between two neighboring flanges to form a continuous boundary that may define the shape of receiving aperture 500.

The dimensions of each flange can vary in different embodiments. In some embodiments, one flange can be substantially similar to an adjacent flange, as depicted with third flange 530 and fourth flange 540. Furthermore, flanges that are opposite to one another across longitudinal midline 504, being symmetrical, may also comprise substantially similar dimensions. In other cases, one flange can differ from a neighboring flange. For example, second flange 520 has a first side 542 that has a longer length than a second side 544, while third flange 530 has a first side 552 that is substantially similar in length to a second side 554.

Referring now to FIG. 6, an isometric view of steaming apparatus 120 is depicted with receiving aperture 500 formed in lid 110 exposing interior chamber 200 (see FIG. 2) of container 100. Article of footwear ("article") 600 is shown above steaming apparatus 120 in an inverted position.

For purposes of clarity, the following detailed description discusses steaming apparatus 120 as used with article 600. However, it will be understood that other embodiments may incorporate a corresponding article of footwear (e.g., a right article of footwear when article 600 is a left article of footwear) that may share some, and possibly all, of the features of article 600 described herein and shown in the figures.

For consistency and convenience, directional adjectives are employed throughout this detailed description corresponding to the illustrated embodiments. The term "longitudinal" as used throughout this detailed description and in the claims refers to a direction extending a length of a component (e.g., an upper or sole component). A longitudinal direction may extend along a longitudinal axis, which itself extends between a forefoot portion and a heel portion of the component. Also, the term "lateral" as used throughout this detailed description and in the claims refers to a direction extending along a width of a component. A lateral direction may extend along a lateral axis, which itself extends between a medial side and a lateral side of a component. Furthermore, the term "vertical" as used throughout this detailed description and in the claims refers to a direction extending along a vertical axis, which itself is generally perpendicular to a lateral axis and a longitudinal axis. For example, in cases where an article is planted flat on a ground surface, a vertical direction may extend from the ground surface upward. This detailed description makes use of these directional adjectives in describing an article and various components of the article, including an upper, a midsole structure, and/or an outer sole structure.

The term "side," as used in this specification and in the claims, refers to any portion of a component facing generally in a lateral, medial, forward, or rearward direction, as opposed to an upward or downward direction. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "exterior" of an element refers to the face of that element that is (or will be) oriented away from the shoe interior in the shoe. Further, the terms "inward" and "inwardly" shall refer to the direction toward the interior of the shoe, and the terms "outward" and "outwardly" shall refer to the direction toward the exterior of the shoe.

Thus, the embodiments may be characterized by various directional adjectives and reference portions. These directions and reference portions may facilitate in describing the portions of an article of footwear with reference to the steaming apparatus. Moreover, these directions and reference portions may also be used in describing subcomponents of an article of footwear or the steaming apparatus (e.g., directions and/or portions of an outer sole structure, an upper, the lid, the container, or any other components).

For purposes of reference, article 600 may be characterized by a number of different regions or portions. For example, article 600 could include a forefoot portion, a midfoot portion, a heel portion, a vamp portion, and an instep portion. Moreover, the various components of article 600 could likewise comprise corresponding portions. Referring to FIG. 6, article 600 may be divided into forefoot portion 605, midfoot portion 625, and heel portion 645. Forefoot portion 605 may be generally associated with the toes and joints connecting the metatarsals with the phalanges. Midfoot portion 625 may be generally associated with the arch of a foot. Likewise, heel portion 645 may be generally associated with the heel of a foot, including the calcaneus bone.

In addition, article 600 may include a lateral side 665 and a medial side 685. In particular, lateral side 665 and medial side 685 may be opposing sides of article 600. Furthermore, both lateral side 665 and medial side 685 may extend through forefoot portion 605, midfoot portion 625, and heel portion 645.

Figure 7:
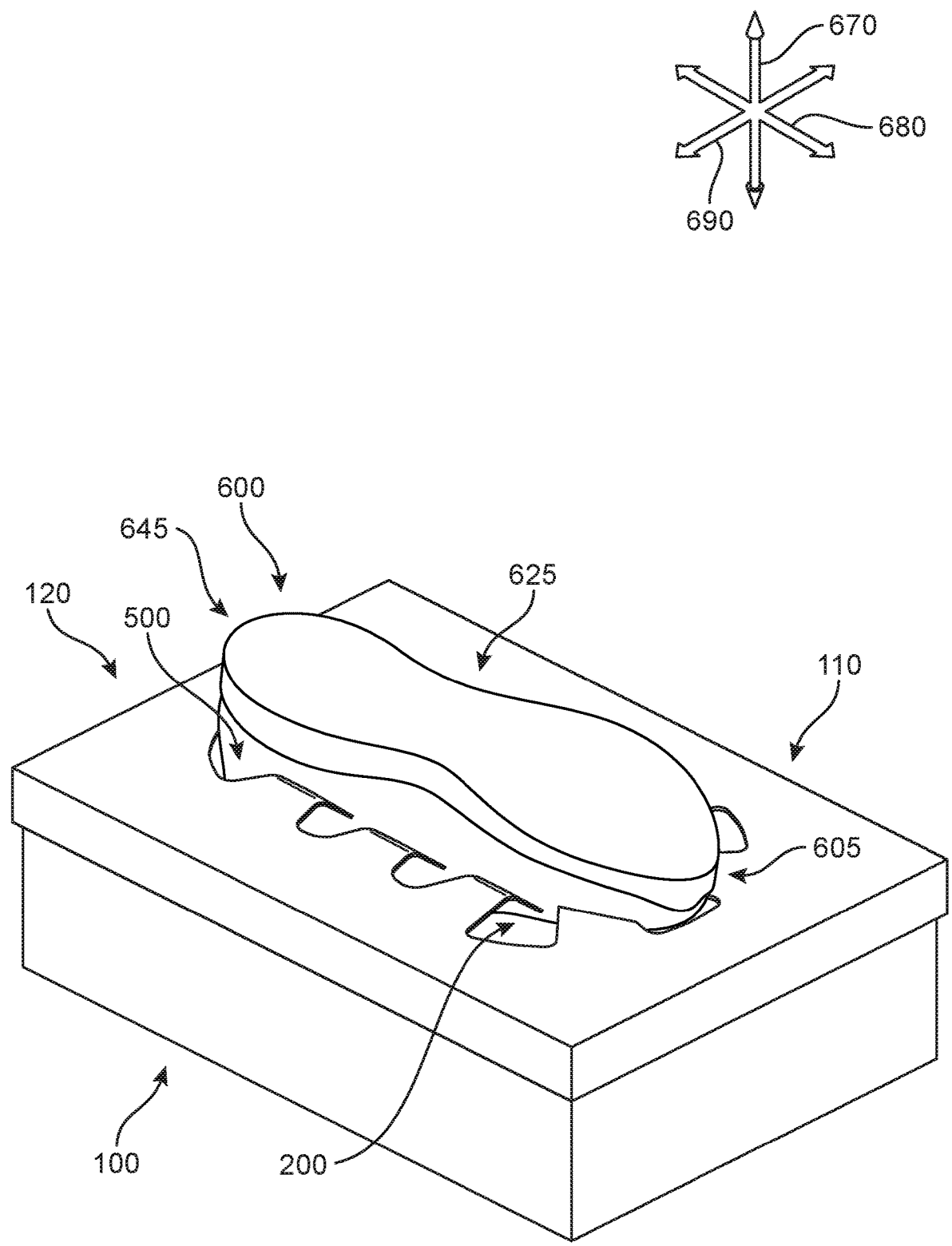
FIG. 7 is a schematic isometric view of an embodiment of a steaming system with an article of footwear.

Referring to FIGS. 6 and 7, for reference purposes, a lateral axis 690 of article 600 may extend between medial side 685 and lateral side 665 of article 600. Additionally, in some embodiments, longitudinal axis 680 may extend from forefoot portion 605 to a heel portion 645. It will be understood that each of these directional adjectives may also be applied to individual components of an article of footwear, such as an upper and/or a sole member. In addition, a vertical axis 670 refers to the axis perpendicular to a horizontal surface defined by longitudinal axis 680 and lateral axis 690.

FIG. 6 illustrates some features and components of article of footwear 600, including an upper 602 and a sole structure 630. Depending on the material of upper 602, in some embodiments, upper 602 may be configured to stretch fit over a foot without the need for additional fasteners. However, in other embodiments, the use of one or more fasteners may allow upper 602 to enlarge or tighten over a foot and/or provide the needed amount of tension to keep article 600 on the foot. For example, in some embodiments, a lace can extend through various apertures or other securing elements and permit the wearer to modify dimensions of upper 602 to accommodate the proportions of the foot. In alternative embodiments, upper 602 may include other lace-receiving elements, such as loops, eyelets, and D-rings. In addition, upper 602 may include a tongue in some embodiments. In other embodiments, there may be other types of fasteners such as straps, cords, clips, or other fastening mechanisms.

Furthermore, in some embodiments, sole structure 630 may be configured to provide traction for article 600. Thus, in different embodiments, traction elements may be included in sole structure 630. In addition to providing traction, sole structure 630 may attenuate ground reaction forces when compressed between the foot and the ground during walking, running, pushing, or other ambulatory activities. The configuration of sole structure 630 may vary significantly in different embodiments to include a variety of conventional or nonconventional structures. In some embodiments, the configuration of sole structure 630 can be configured according to one or more types of surfaces on which sole structure 630 may be used. Examples of surfaces include, but are not limited to, natural turf, synthetic turf, dirt, hardwood flooring, skims, wood, plates, footboards, boat ramps, as well as other surfaces.

The various portions of sole structure 630 may be formed from a variety of materials. For example, sole structure 630 may include a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, sole structure 630 may incorporate fluid-filled chambers, plates, moderators, or other elements that further attenuate forces, enhance stability, or influence the motions of the foot. Furthermore, other portions of sole structure 630, such as an outsole, can be formed from a wear-resistant rubber material that is textured to impart traction. It should be understood that the embodiments herein depict a configuration for sole structure 630 as an example of a sole structure that may be used in connection with upper 602, and a variety of other conventional or nonconventional configurations for sole structure 630 may also be utilized. Accordingly, the structure and features of sole structure 630 or any sole structure utilized with upper 602 may vary considerably.

Sole structure 630 is secured to upper 602 and extends between a foot and the ground when article 600 is worn. In different embodiments, sole structure 630 may include different components. For example, sole structure 630 may include an outsole. Sole structure 630 may further include a midsole and/or an insole. In some embodiments, one or more of these components may be optional. In addition, sole structure 630 may include components or portions that extend toward and/or attach to a portion of upper 602. Such components may provide additional support and compressive strength to article 600.

In different embodiments, upper 602 may be joined to sole structure 630 and define an interior cavity designed to receiver a wearer's foot. In some embodiments, upper 602 includes a throat opening 606 that provides access for a foot into the interior cavity of the article and is configured to receive a foot of a wearer. Furthermore, article 600 includes a collar portion 604, which is a portion of upper 602 that surrounds throat opening 606. In some embodiments, collar portion 604 includes the collar and heel regions of an article. Furthermore, for purposes of reference, article 600 includes a rearmost portion 614, a vamp portion 608, and a toe portion 612. Toe portion 612 is associated with the region of upper 602 toward the front of article 600, where the toes would be positioned when a foot is inserted in article 600. Vamp portion 608 of upper 602 extends between collar portion 604 and toe portion 612. Rearmost portion 614 is located in heel portion 645 at the region that is substantially furthest from toe portion 612 along longitudinal axis 680.

In FIG. 7, article 600 is shown as it is inserted in an inverted position and received by receiving aperture 500 in steaming apparatus 120. Thus, in some embodiments, receiving aperture 500 in lid 110 is configured to hold an article of footwear in an inverted position. In other embodiments, receiving aperture 500 may hold an article of footwear in any position.

As shown in FIGS. 6 and 7, receiving aperture 500 can be sized and dimensioned to receive and hold an article of footwear. In some embodiments, flanges 502 may undergo or exhibit deformation or bending in response to the force exerted by the insertion of article 600. In some cases, two or more flanges 502 may experience the substantially same degree of deformation. In other cases, two or more flanges 502 may experience different degrees of deformation. For example, the weight distribution of article 600 may differ as it is disposed in receiving aperture 500, causing the flanges to bend toward chamber 200 to varying degrees. In addition, because article 600 may include different structural features or components in one region relative to another region, different forces may be applied throughout lid 110. In one embodiment, forefoot portion 605 may exert a greater force than midfoot portion 625. In another embodiment, heel portion 645 may exert a greater force than midfoot portion 625 or forefoot portion 605.

Figure 8:
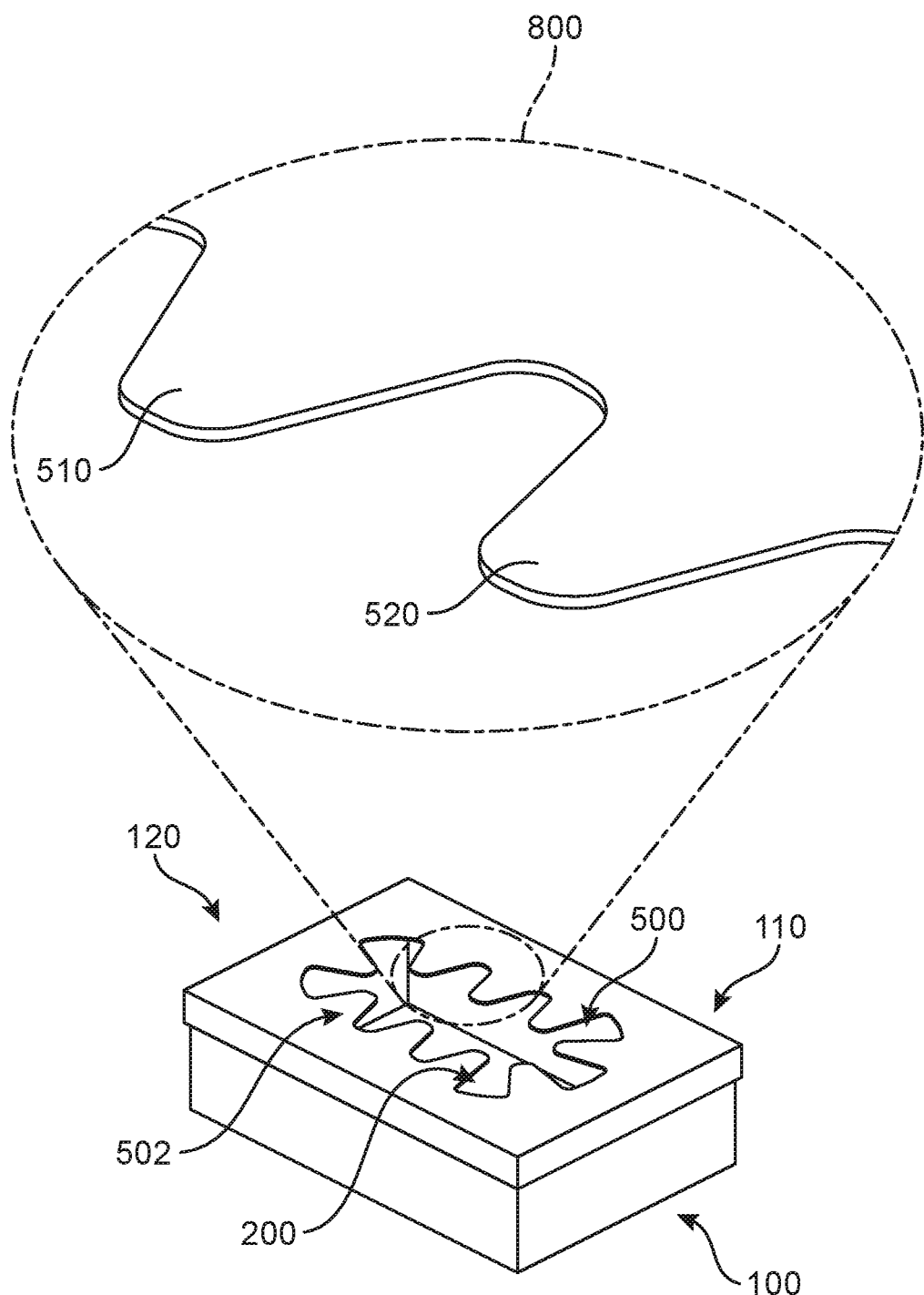
FIG. 8 is a schematic isometric view of an embodiment of a steaming system.
Figure 9:
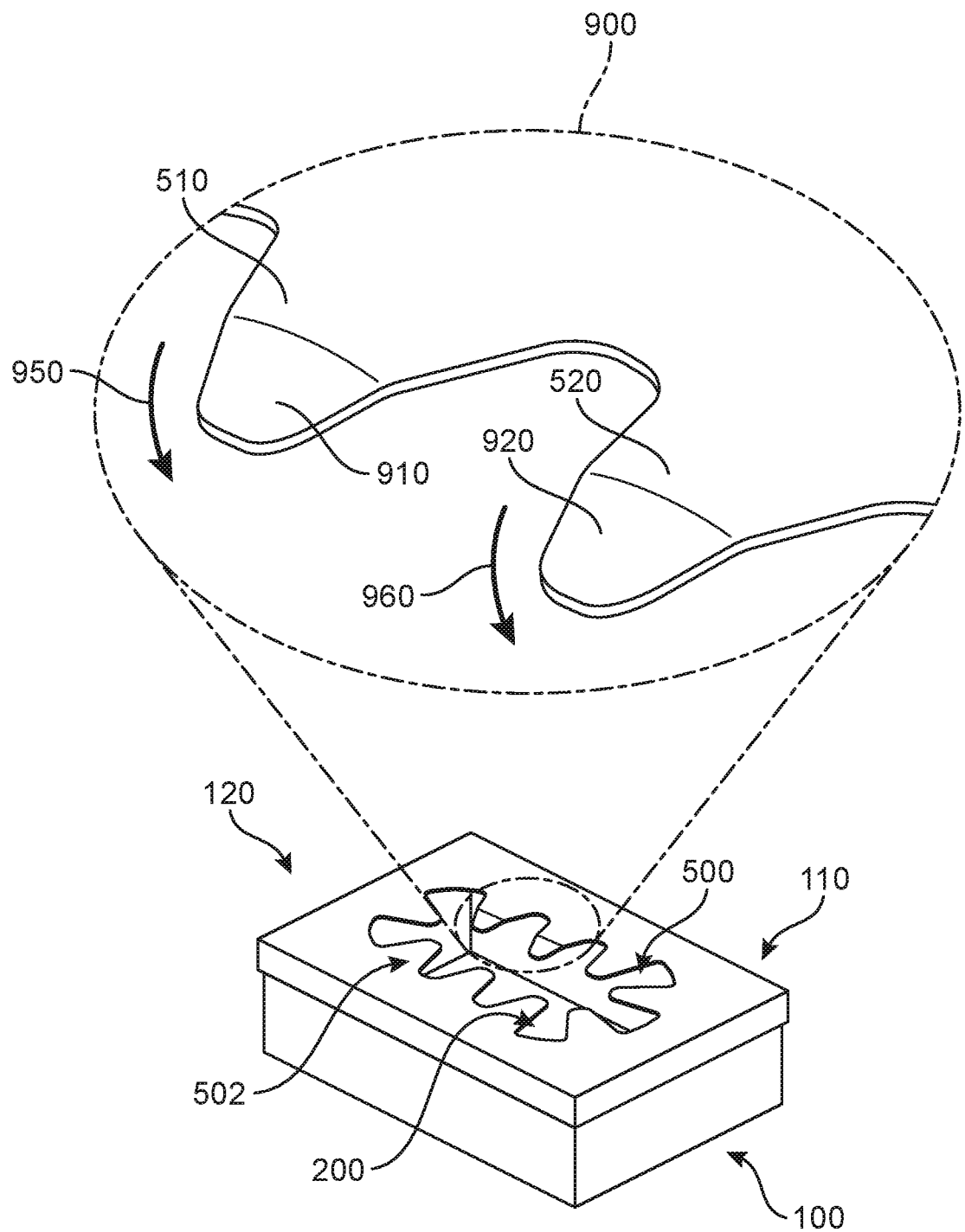
FIG. 9 is a schematic isometric view of an embodiment of a steaming system.

FIGS. 8 and 9 illustrate magnified views of an embodiment of the deformation that may occur. In FIG. 8, a neutral state in which no external force has been applied on lid 110 is depicted. First flange 510 and second flange 520 are illustrated in a first magnified view 800. It can be seen that first flange 510 and second flange 520 are substantially flat and aligned in a direction parallel with the remainder of lid 110. In FIG. 9, an example of a first force 950 (represented by an arrow) as applied to first flange 510 and a second force 960 (represented by an arrow) as applied to second flange 520 is shown in a second magnified view 900. In second magnified view 900, first flange 510 and second flange 520 are bent inward toward chamber 200 in a deformed state. It can be seen that first flange 510 is bent along a first deformation region 910 and second flange 520 is bent along a second deformation region 920. In different embodiments, the size of each deformation region of a flange can vary. In some embodiments, a flange may experience minimal deformation and exhibit little or no bending in response to the insertion of an article of footwear. In other embodiments, a flange may bend substantially and the deformation region may be larger. It should be understood that the deformation may be elastic in some embodiments, and flanges may return or resume the neutral state after the article of footwear has been removed. However, in other embodiments, depending on the material comprising lid 110, the flanges may remain at least partially deformed after the article of footwear has been removed.

Figure 10:
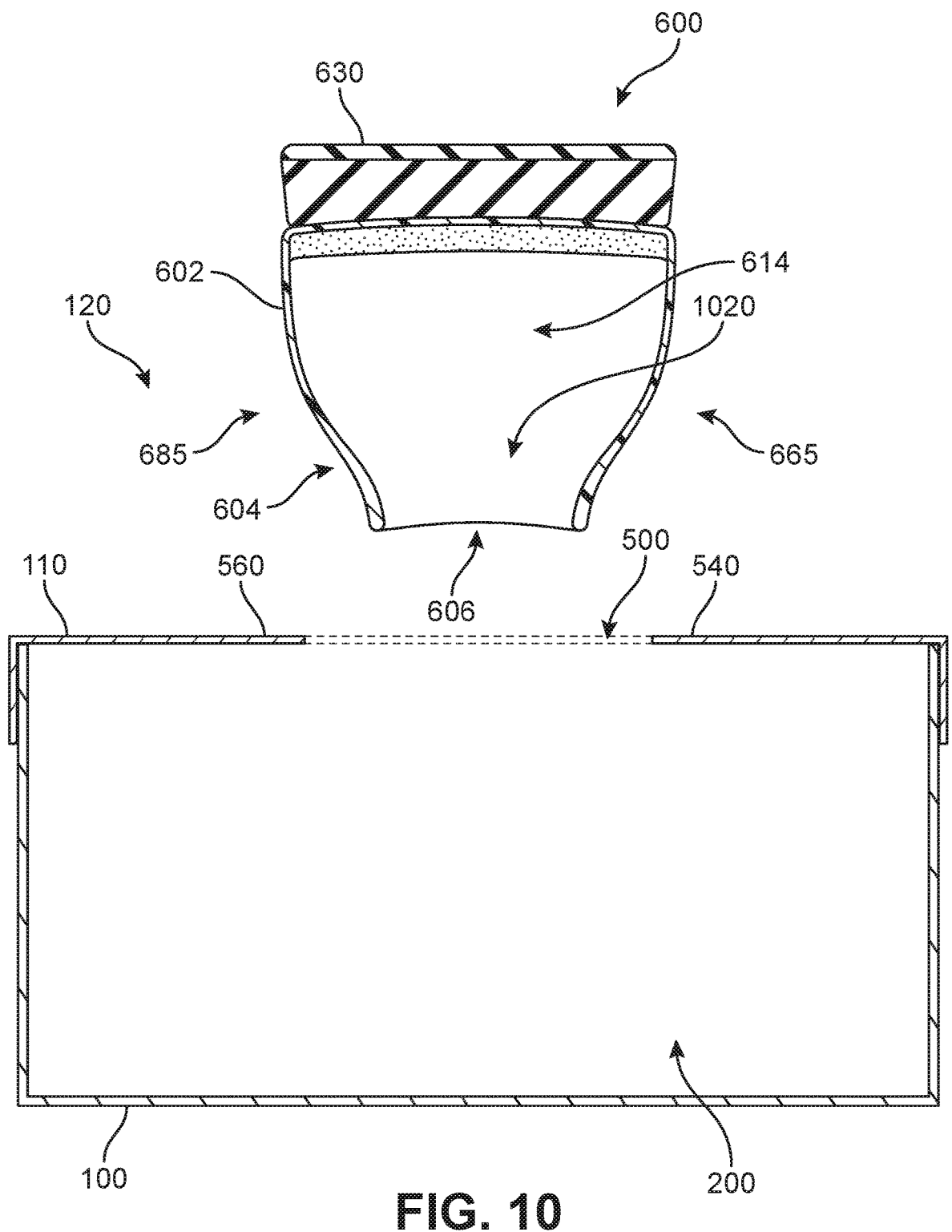
FIG. 10 is a schematic lateral cross section of an embodiment of a steaming system with an article of footwear.
Figure 11:
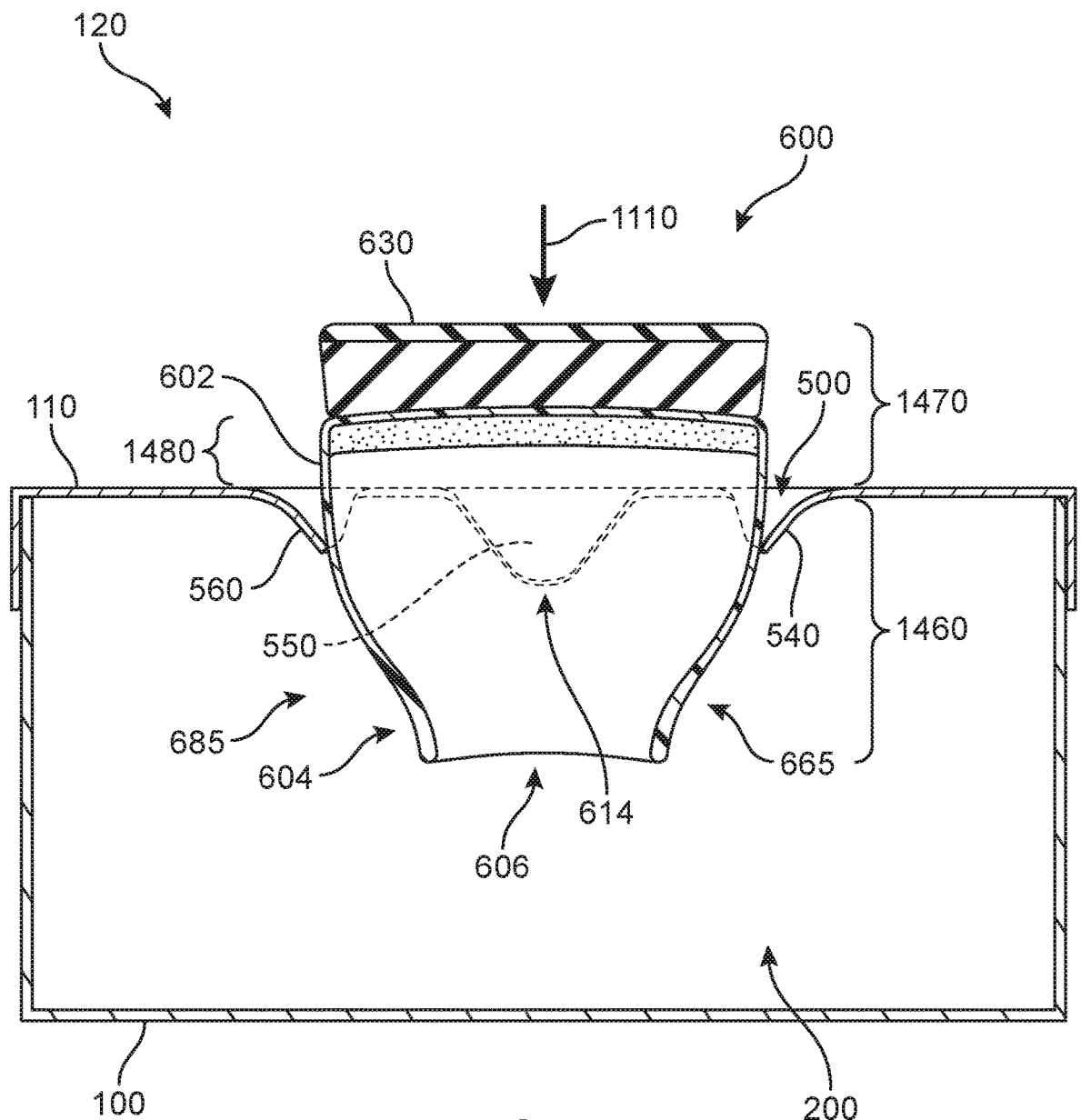
FIG. 11 is a schematic lateral cross section of an embodiment of a steaming system with an article of footwear.

FIGS. 10 and 11 illustrate a cross-sectional detail of an embodiment of steaming apparatus 120 with lid 110 used to hold in place article of footwear 600 along lateral axis 690. In FIG. 10, article 600 is shown above steaming apparatus 120 in an inverted position, similar to the view provided in FIG. 6 above. As discussed with respect to FIG. 6, article 600 includes throat opening 606 that is configured to receive a foot of a wearer, where throat opening 606 is bounded by collar portion 604. When article 600 is inserted or disposed within receiving aperture 500, as shown in FIG. 11, different portions of article 600 can contact the perimeter of receiving aperture 500. In some embodiments, receiving aperture 500 in lid 110 is sized and dimensioned to hold article 600 in an inverted position by contacting a portion of upper 602. In some embodiments, receiving aperture 500 can be sized and dimensioned to receive at least a portion of collar portion 604 of article 600, as shown in FIG. 11. In other embodiments, receiving aperture 500 may be sized and dimensioned to hold additional portions of upper 602, as will be discussed with reference to FIGS. 12-14.

In FIG. 11, it can be seen that fourth flange 540, fifth flange 550, and sixth flange 560 are each contacting portions of upper 602. Fourth flange 540 is shown contacting a portion of lateral side 665, and sixth flange 560 is shown as it contacts a portion of medial side 685. In addition, fifth flange 550, which is disposed between fourth flange 540 and sixth flange 560 in receiving aperture 500, is shown contacting a portion of rearmost portion 614. Thus, one or more flanges can be configured to help support and hold portions of article 600 within steaming apparatus 120. Furthermore, as noted above, in some embodiments, one or more flange portions can slightly bend to different degrees as a result of the weight distribution or applied force 1110 of article 600 in receiving aperture 500.

Figure 12:
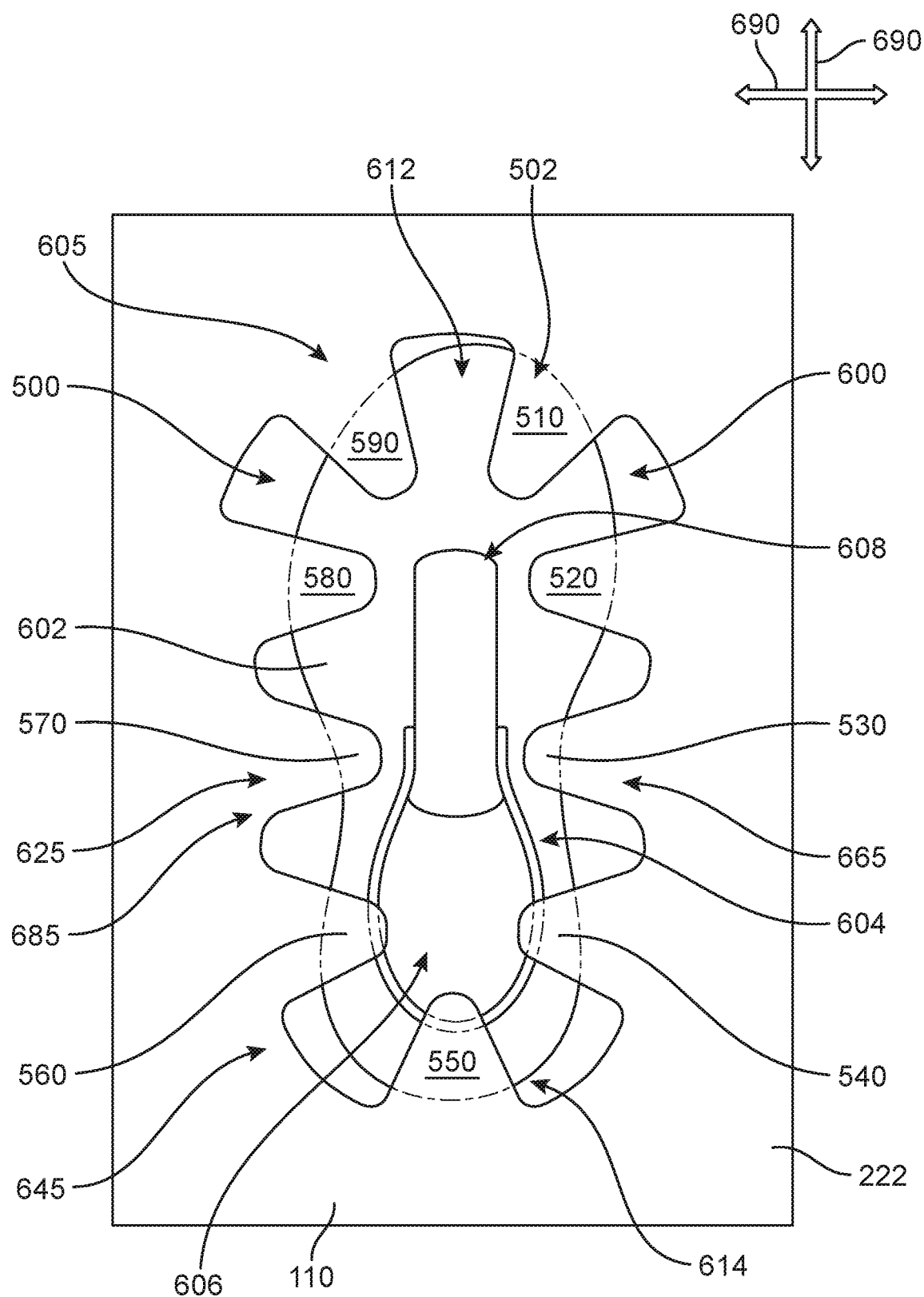
FIG. 12 is a schematic bottom-up view of an embodiment of a lid for a steaming system with an article of footwear.
Figure 13:
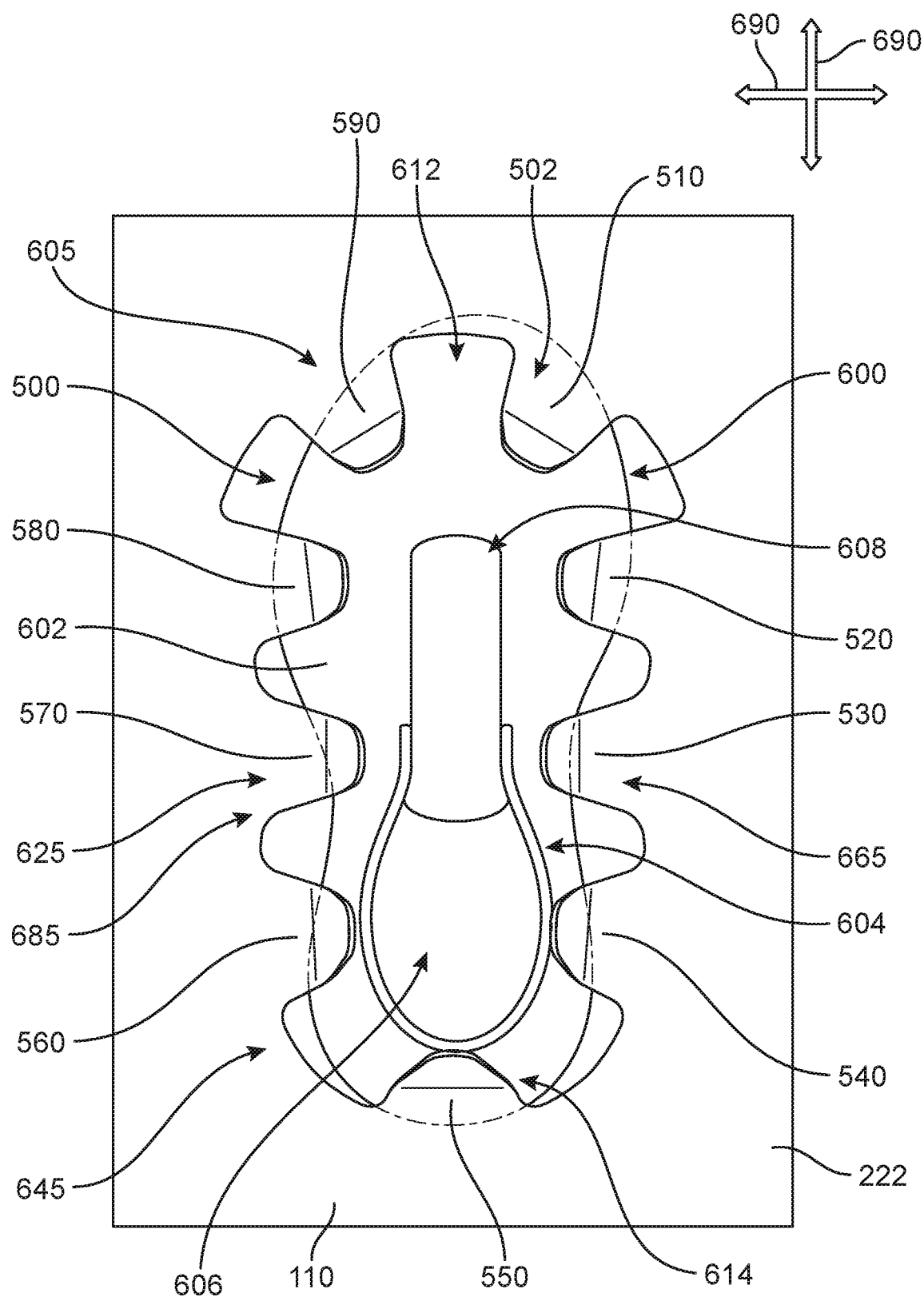
FIG. 13 is a schematic bottom-up view of an embodiment of a lid for a steaming system with an article of footwear.

In FIGS. 12 and 13, an embodiment of two "bottom-up" views of lid 110 and article 600 are shown. FIG. 12 provides a bottom-up view of inverted article 600 disposed above lid 110, similar to the illustration of FIG. 6, while FIG. 13 provides a bottom-up view of article 600 as it is inserted in receiving aperture 500, similar to the illustration in FIG. 7. Thus, the view is one of inner side 222 of lid 110 as it is about to receive article 600 in FIG. 12, and the subsequent view in FIG. 13 is of inner side 222 of lid 110 as it holds article 600 in receiving aperture 500. It can be seen that as article 600 is inserted in receiving aperture 500, flanges 502 can contact different portions of upper 602. In the embodiment of FIG. 13, first flange 510, second flange 520, third flange 530, and fourth flange 540 contact lateral side 665, and sixth flange 560, seventh flange 570, eighth flange 580, and ninth flange 590 contact medial side 685. Furthermore, fifth flange 550 is disposed adjacent to a portion of heel portion 645, and may contact either or both medial side 685 and lateral side 665 of article 600 in some cases. In other embodiments, one or more flanges may not contact the article, as the shape and size of an article may vary with respect to the receiving aperture and corresponding flanges.

The configuration of receiving aperture 500 in lid 110 can facilitate the steaming of article 600 in different embodiments. In one embodiment, the arrangement of flanges as shown may increase the stability of article 600 while article 600 is positioned in receiving aperture 500. For example, due to the staggered arrangement of flanges around article 600 in receiving aperture 500, article 600 is supported in a generally consistent manner throughout steaming apparatus 120. In addition, the arrangement of the flanges allows article 600 to maintain its position and at the same time minimize the surface area of article 600 that is in direct contact with the materials of lid 110. This can increase the exposure of the article to any steam. Furthermore, the shape of receiving aperture 500 and the corresponding arrangement of the flanges can allow article 600 of various types, sizes, and configurations to be inserted and securely received by steaming apparatus 120. Thus, the arrangement of the flanges can maximize the flow of steam to articles of different types and shapes, allowing various articles to be steamed using a substantially similar steaming apparatus configuration. In some cases, this can streamline the manufacturing of steaming apparatuses such that substantially similar containers and lids can be used with a variety of different articles (e.g., articles of footwear designed for different sports or activities, etc.), increasing efficiency and ease of production.

In some embodiments, one or more flanges 502 may bend inward or deform. In some cases, the bending or deformation of flanges 502 may facilitate the secure placement of article 600 in receiving aperture 500. In addition, in some embodiments, the deformation of flanges 502 can allow more areas of upper 602 to be positioned within the chamber of the container of the steaming apparatus. For example, as shown in FIG. 13, substantially all of throat opening 606 has been inserted within receiving aperture 500. The increased exposure of the materials comprising an article to the interior of the chamber can provide additional benefits, which will be discussed further below.

Figure 14:
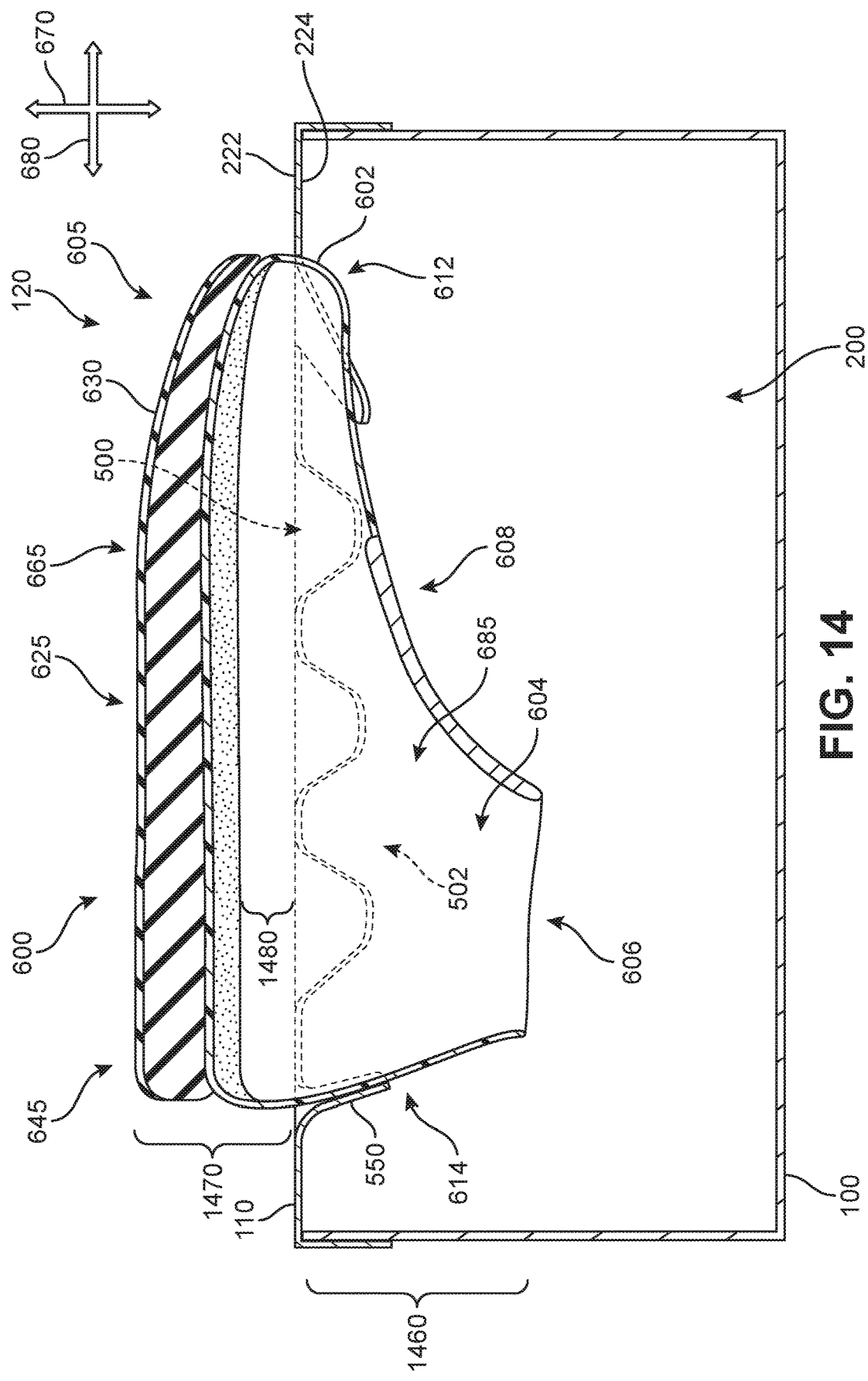
FIG. 14 is a schematic longitudinal cross section of an embodiment of a steaming system with an article of footwear.

Thus, in different embodiments, due to the configuration of receiving aperture 500, different portions of article 600 can be located within the chamber, while other portions of article 600 remain exposed or outside of chamber 200. To better illustrate the capacity of chamber 200 to substantially surround, envelop, receive, encase, or otherwise hold different portions of upper 602, FIG. 14 provides a cross-sectional detail along longitudinal axis 680 of an embodiment of steaming apparatus 120. Referring to FIGS. 11 and 14, it can be seen that in some embodiments, article 600 may comprise an exposed portion 1470 and an insertable portion 1460. Exposed portion 1470 refers to the portion of article 600 that remains outside of chamber 200 of container 100 when article 600 is inserted into and received by receiving aperture 500. Insertable portion 1460 refers to the portion of article 600 that is located within chamber 200 when article 600 is inserted into and received by receiving aperture 500. In different embodiments, different regions of article 600 can be associated with insertable portion 1460, and different regions of article 600 can be associated with exposed portion 1470. In the embodiments of FIGS. 11 and 14, it can be seen that a substantial majority of upper 602 may comprise insertable portion 1460. Furthermore, insertable portion 1460 extends from forefoot portion 605 through midfoot portion 625 and into heel portion 645 along both lateral side 665 and medial side 685 of article 600. In some embodiments, insertable portion 1460 may include all or a substantial majority of collar portion 604, such that the entirety of throat opening 606 is disposed within chamber 200. In one embodiment, sole structure 630 is located entirely outside of chamber 200, such that the entirety of sole structure 630 is included in exposed portion 1470. However, in other embodiments, a portion of sole structure 630 may be inserted within chamber 200. Furthermore, in some embodiments, a region of upper 602 adjacent to sole structure 630 may be located outside of chamber 200, as shown in FIGS. 11 and 14 (referred to here as exposed upper 1480). In some cases, this region may be of a substantially uniform width with respect to vertical axis 670. In one case, exposed upper 1480 can wrap or extend around article 600 on both lateral side 665 and medial side 685. In one embodiment, exposed upper 1480 can extend in a continuous manner, circumscribing article 600. However, in other embodiments, exposed upper 1480 may be discontinuous, and comprise of one or more portions throughout upper 1480, such that insertable portion 1460 extends up to sole structure 630 and encompasses an entire width of upper 602 along vertical axis 670.

Figure 15:
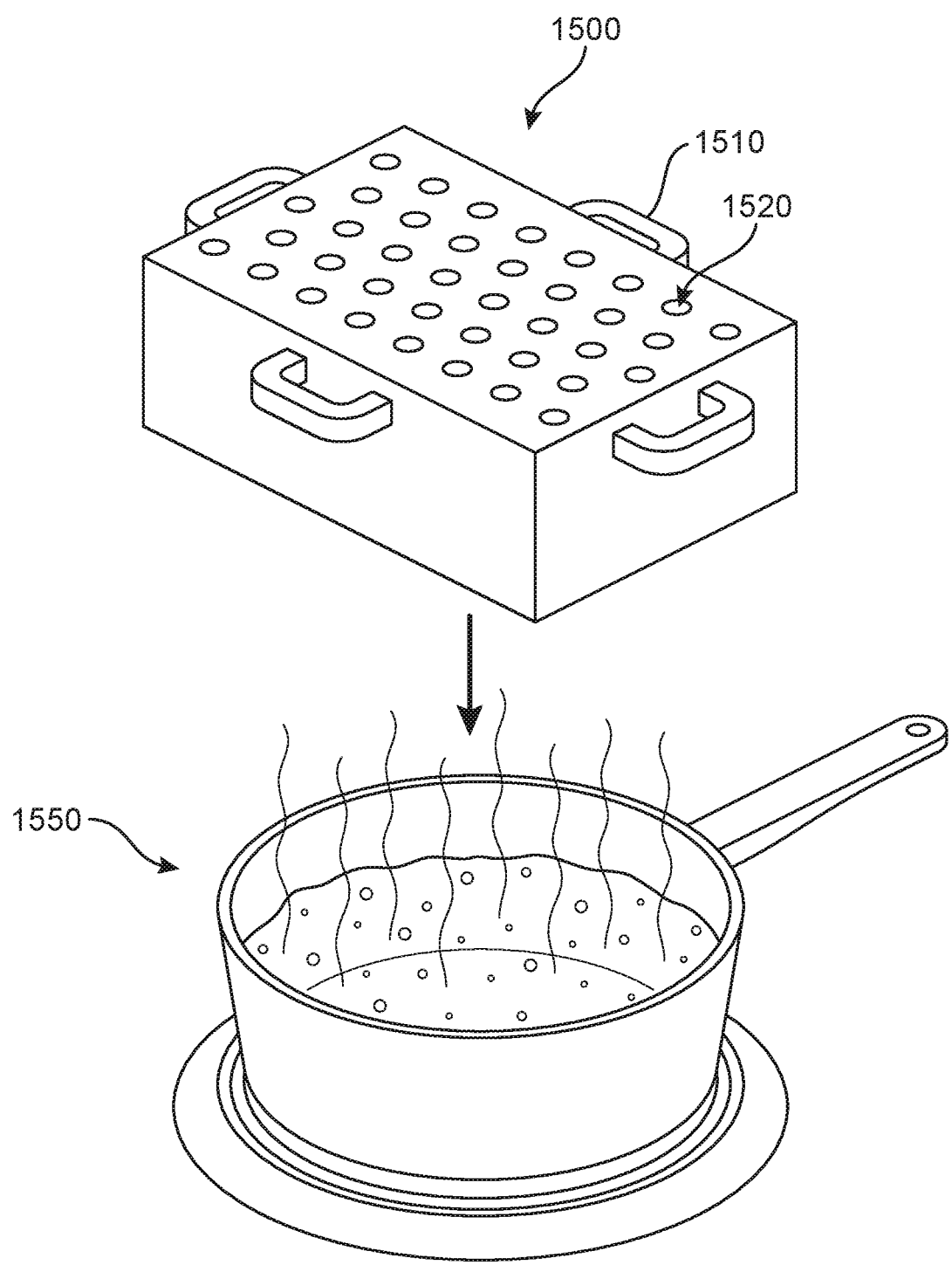
FIG. 15 is an isometric view of an embodiment of a steam source for a steaming system.
Figure 16:
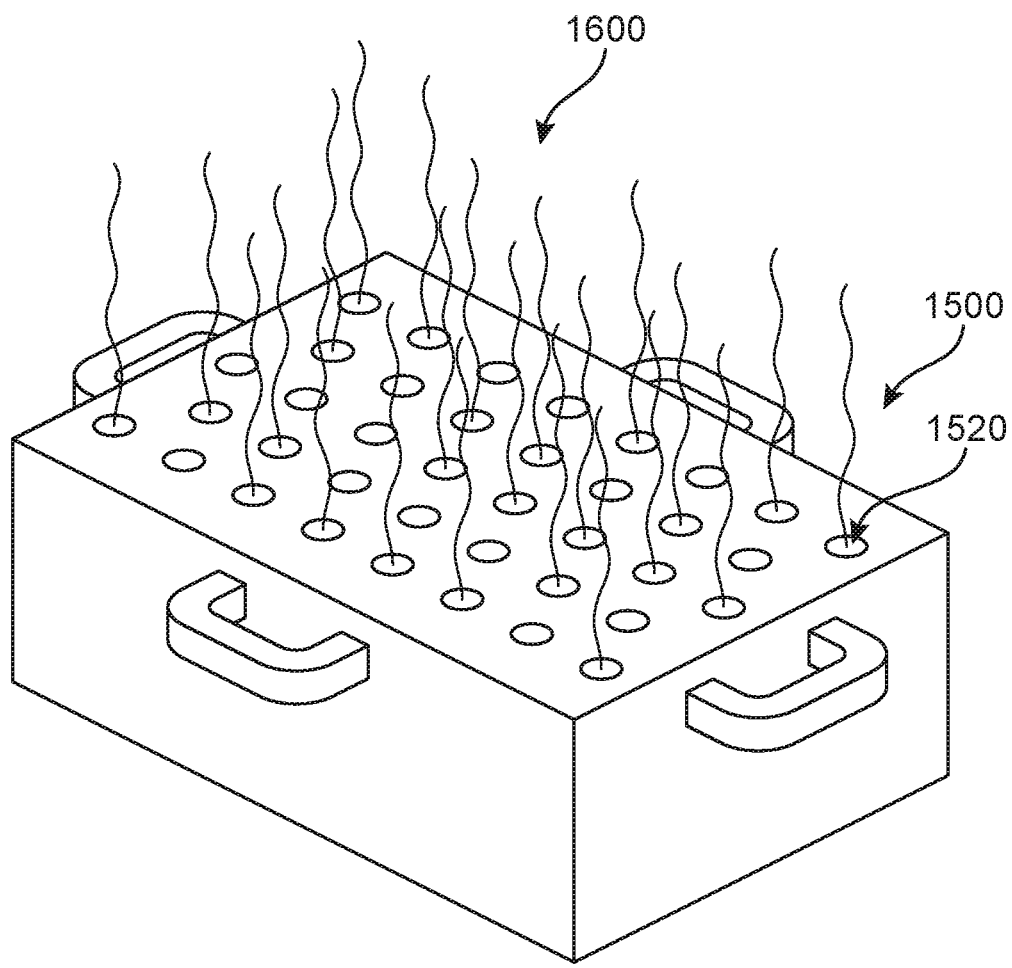
FIG. 16 is an isometric view of an embodiment of a steam source for a steaming system.
Figure 17:
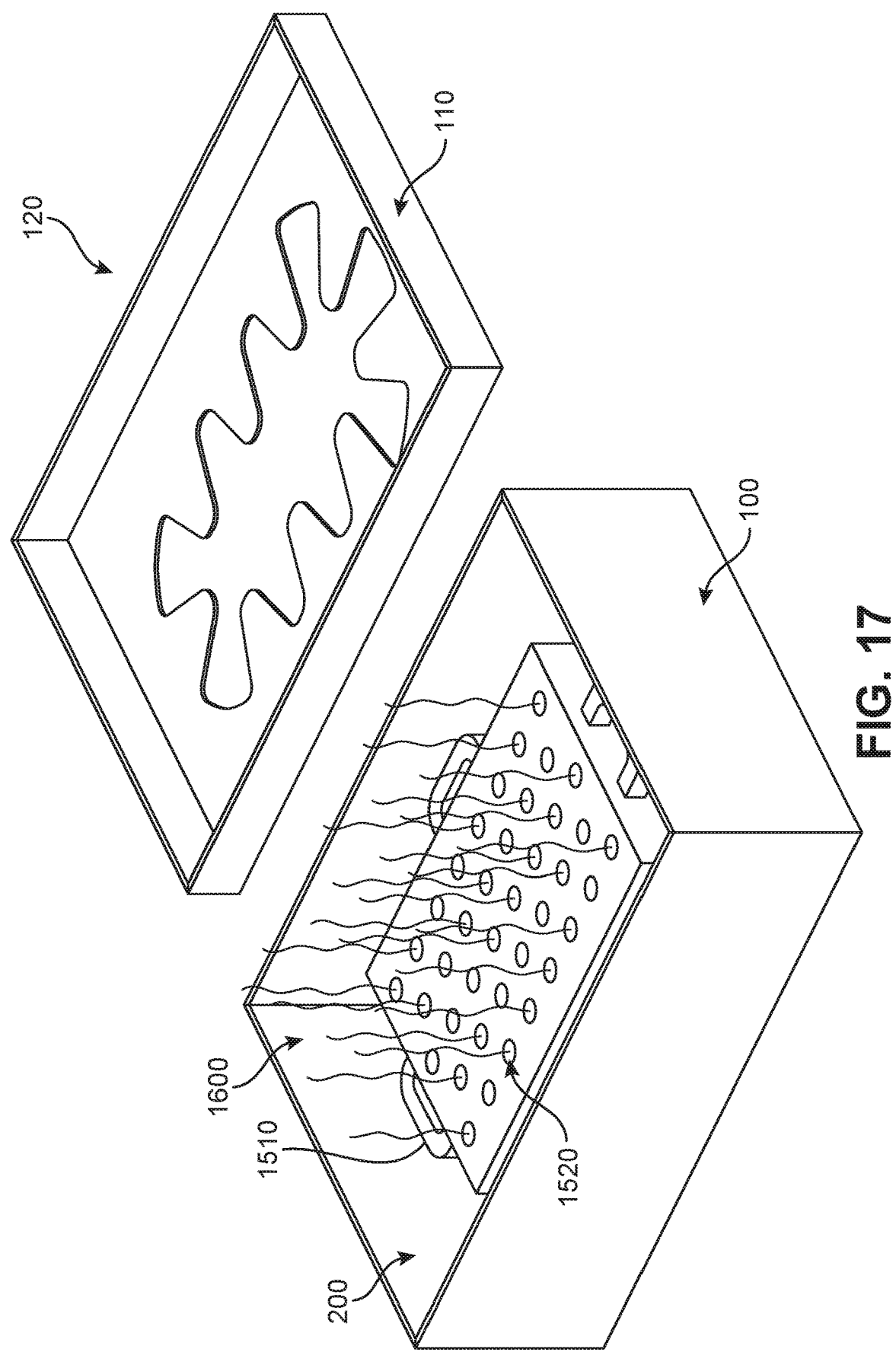
FIG. 17 is an isometric view of an embodiment of a steam source disposed in a steaming system.

Referring now to FIGS. 15-21, an embodiment of a process of using steaming apparatus with an article of footwear as the article is subjected to a steam environment is depicted. In FIG. 15, a steaming source 1500 is illustrated as a container with a plurality of steam release holes ("holes") 1520 and handles 1510. It should be understood that steaming source 1500 is shown herein for illustrative purposes only, and that any other type of steaming source or steam generator known in the art may be utilized with the steaming apparatus, including but not limited to, portable heating devices, battery-powered heating devices, vacuum systems, condensation systems, compression systems, heated and/or moist textiles, distilled or treated water, or other steaming sources. In FIG. 15, as an example, steaming source 1500 is shown as it is heated over a pot 1550 containing boiling water. In other cases, a source of steam may be generated by introducing steaming source 1500 to a heat source, including, but not limited to, a microwave, an oven, a stovetop, a heating coil, as well other sources of steam. Thus, steaming source 1500 may be heated by any means or mechanism known in the art for generating or providing heat. In some embodiments, steaming source 1500 may be prepared for use with a steaming apparatus by increasing the heat content of steaming source 1500 such that steaming source 1500 begins to release or emit steam 1600, as shown in FIG. 16. Once a particular amount or type of steam 1600 is being released by steaming source 1500 and/or a predetermined temperature is measured as associated with steaming source 1500, steaming source 1500 can be moved to the interior of container 100 of steaming apparatus 120, as shown in FIG. 17. In some embodiments, handles 1510 can be used to facilitate the insertion of steaming source 1500 into chamber 200. Once steaming source 1500 is securely positioned within chamber 200, lid 110 may be placed over container 100.

Steaming source 1500 may include provisions for communication of steam 1600 to chamber 200 and/or article 600. In some embodiments, holes 1520 may be formed along a perforated plate or lid. The perforated plate may be a substantially flat or two-dimensional material comprising a plurality of perforations or holes 1520. The size, arrangement, and shape of holes 1520 may vary in different embodiments. Smaller holes 1520 may slow the transport of steam 1600 to chamber 200, while larger holes 1520 may hasten the movement or release of steam 1600. Furthermore, by arranging holes 1520 toward one area, steam 1600 can be directed or concentrated toward a specific portion of article 600 in some embodiments, if so desired. In one embodiment, holes 1520 are arranged in a substantially uniform manner across the top of steaming source 1500. Thus, steaming source 1500 may provide a regulated flow of steam 1600 into chamber 200 in some embodiments, and subsequently a steady and relatively even exposure of steam 1600 to an article. In one embodiment, holes 1520 may be configured to allow fluid communication between steaming source 1500 and chamber 200. Furthermore, in one embodiment, steam 1600 may be low-pressure steam, exposing the article to a relatively low level of heat intensity. In other words, the steam may be generated using a latent heat source, rather than sensible heat. Thus, in some embodiments, steam may be produced and/or utilized that is a result of the release of heat from a change in state, rather than a change in temperature. In some embodiments, the steaming apparatus can be used by a consumer without direct incorporation of a heating element or heating component in the container or the chamber.

Figure 18:
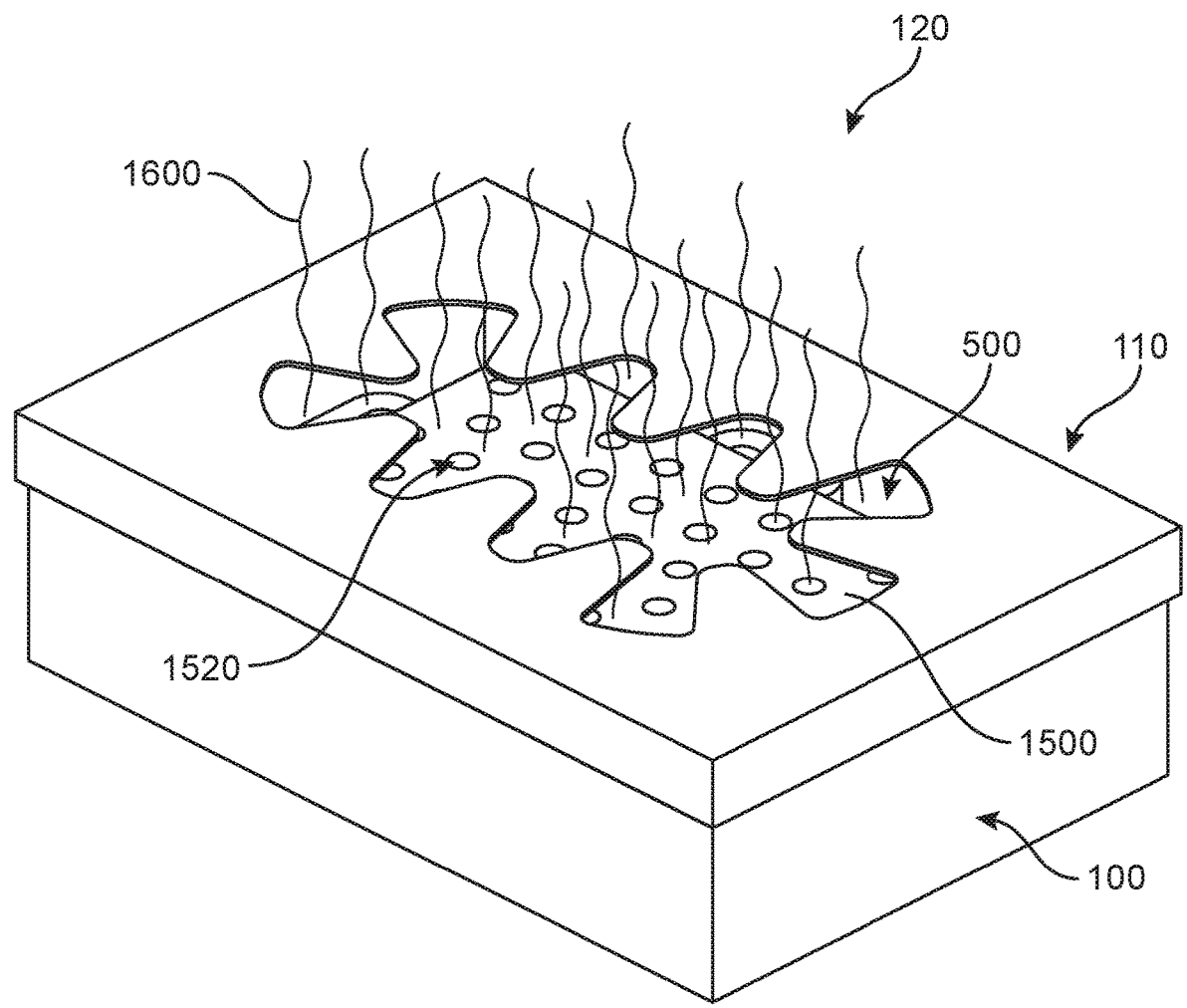
FIG. 18 is an isometric view of an embodiment of a steam source disposed in a steaming system.
Figure 19:
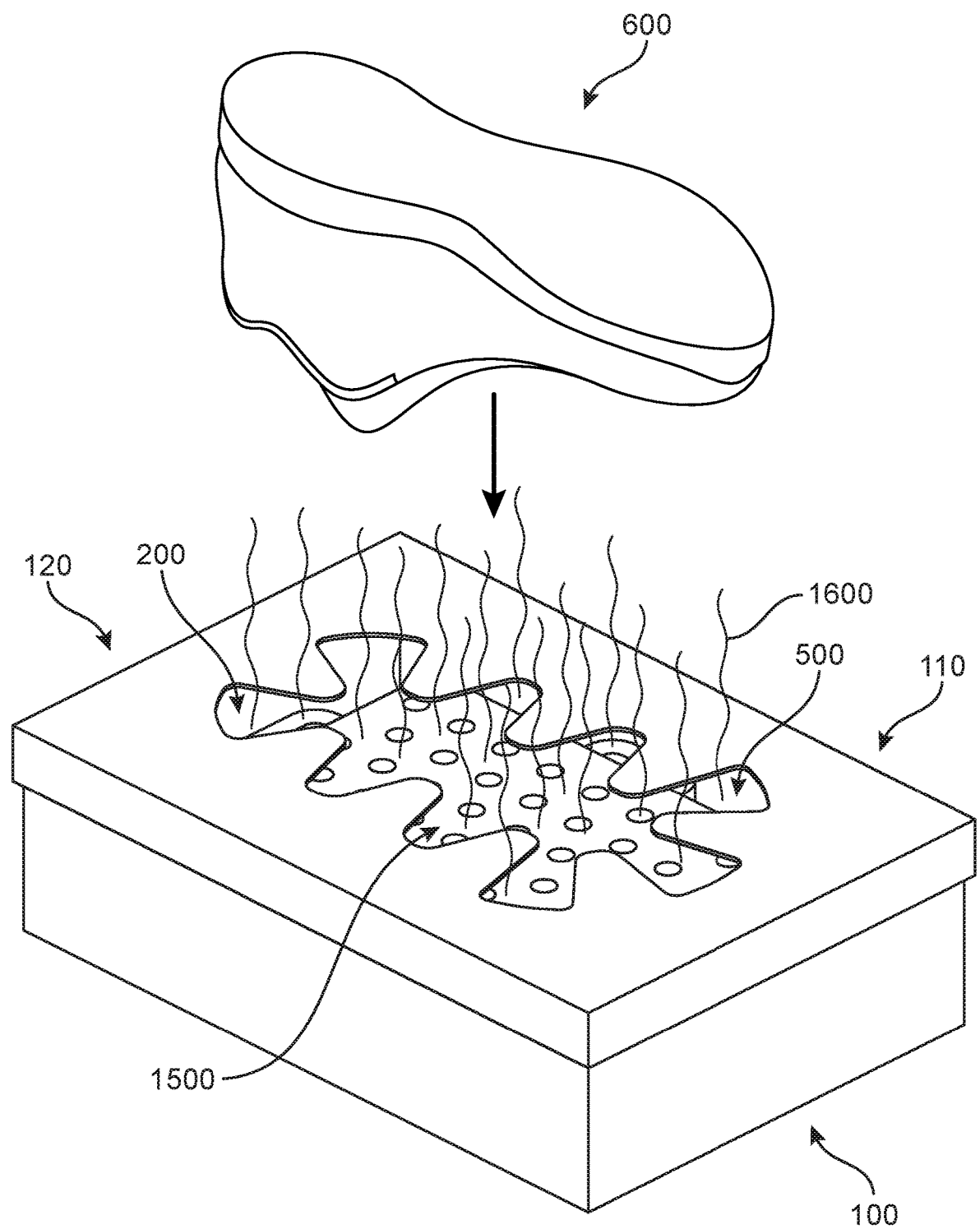
FIG. 19 is an isometric view of an embodiment of a steam source disposed in a steaming system with an article of footwear.
Figure 20:
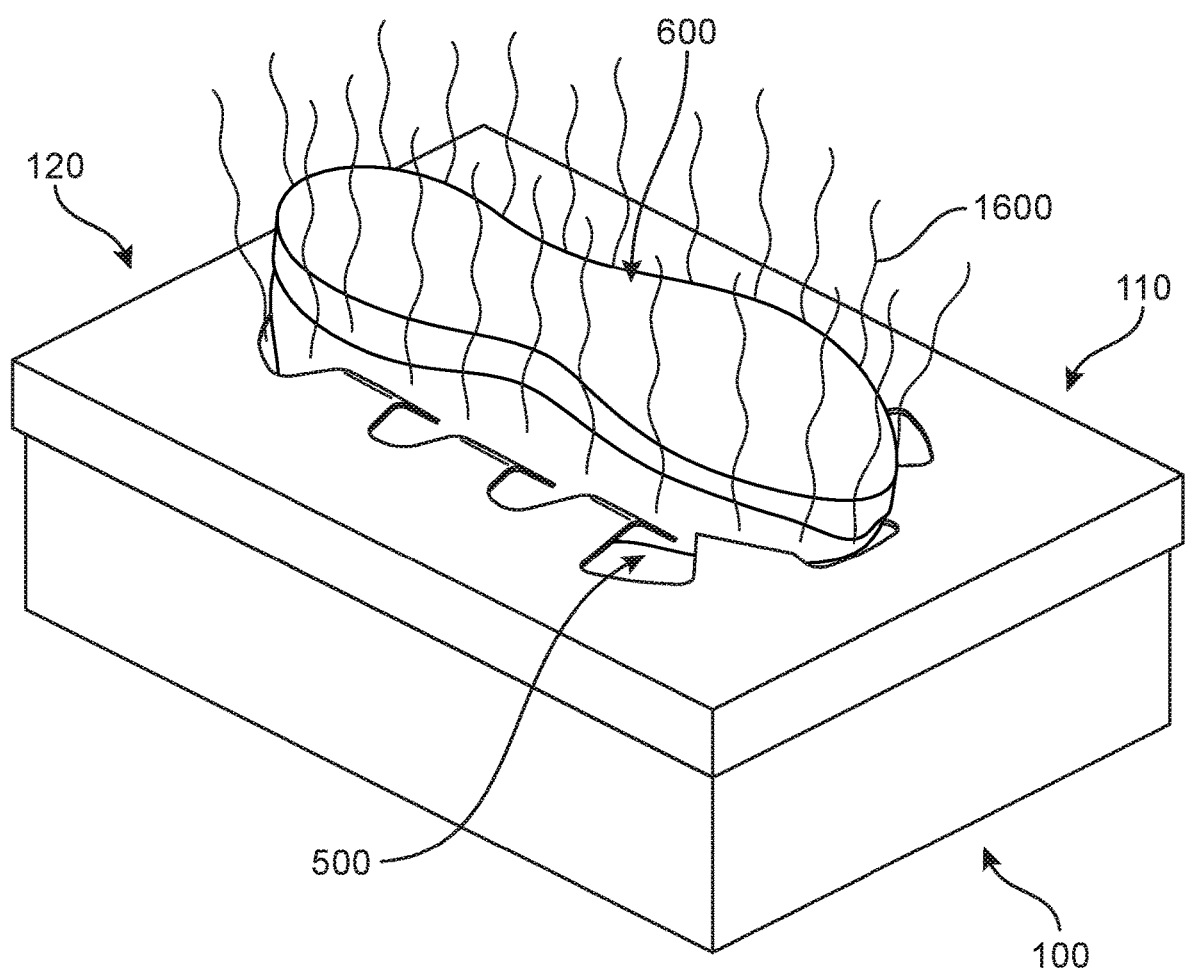
FIG. 20 is an isometric view of an embodiment of a steam source disposed in a steaming system with an article of footwear.
Figure 21:
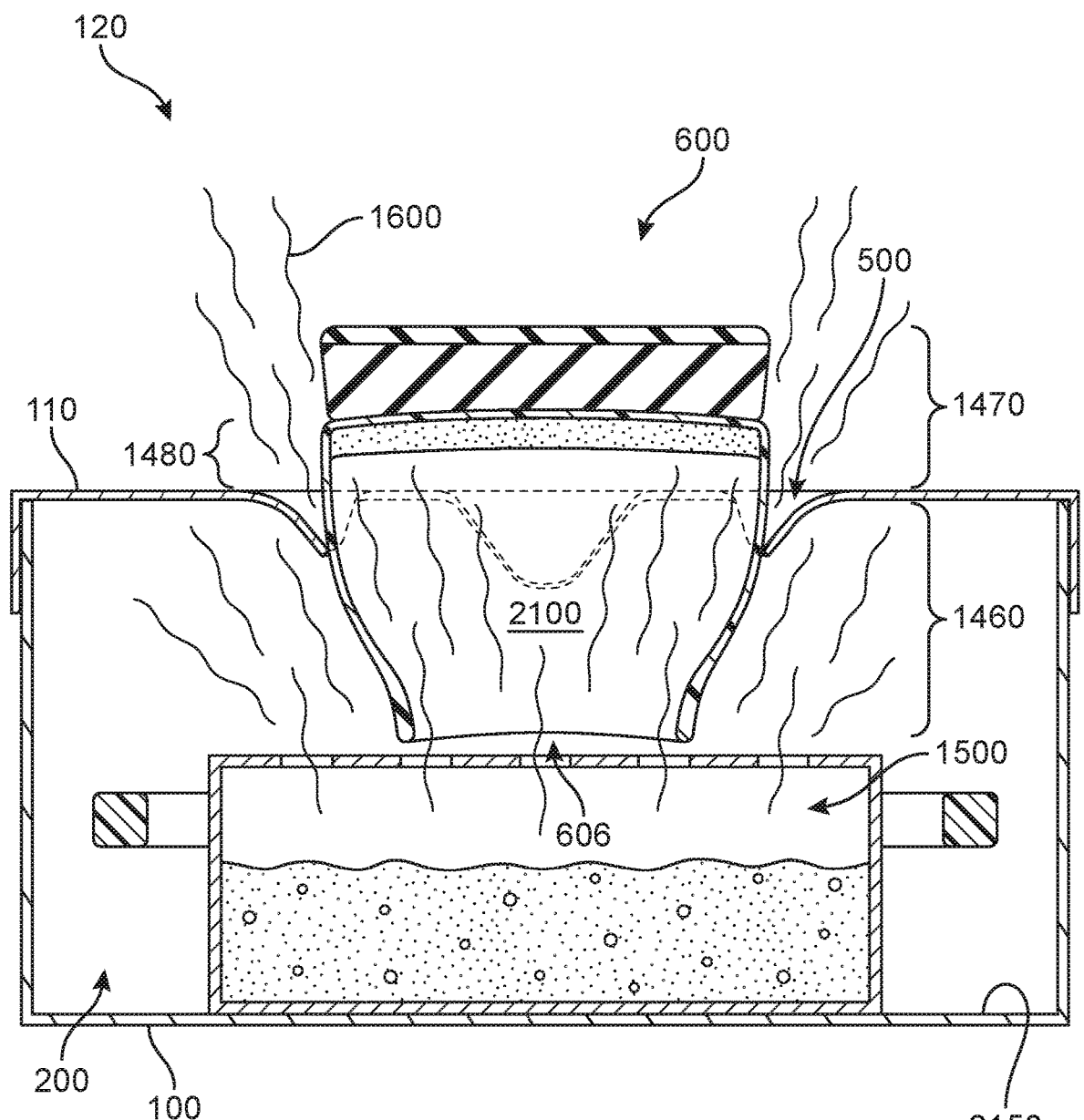
FIG. 21 is a schematic lateral cross section of an embodiment of a steam source disposed in a steaming system with an article of footwear.
Figure 22:
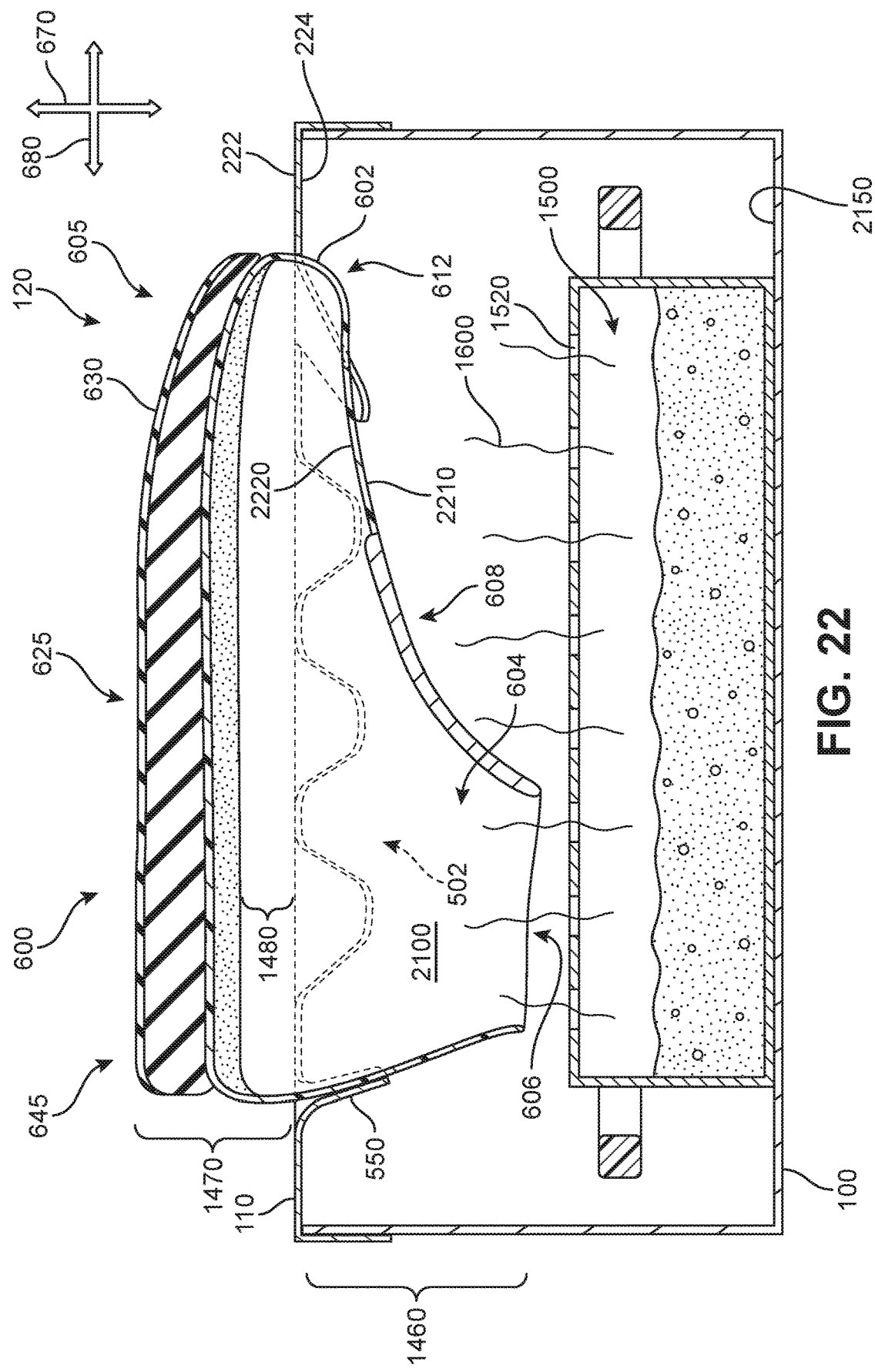
FIG. 22 is a schematic longitudinal cross section of an embodiment of a steam source disposed in a steaming system with an article of footwear.

As shown in FIG. 18, receiving aperture 500 is now disposed substantially directly over steaming source 1500, and steam 1600 may rise from holes 1520 into chamber 200 in some cases. In one embodiment, steam 1600 can also rise and escape from steaming apparatus 120 through receiving aperture 500. Referring now to FIG. 19, article 600 is depicted above an embodiment of steaming apparatus 120, in a position substantially similar to that depicted in FIGS. 6, 10, and 12. As article 600 is lowered into receiving aperture 500, steam 1600 may begin to flow near and/or around article 600. Steam 1600 may be substantially trapped inside chamber 200 in some embodiments, though in some embodiments, some steam may escape around openings associated with receiving aperture 500. In FIG. 20, article 600 has been lowered into receiving aperture 500, and is shown in a position substantially similar to that depicted in FIGS. 7, 11, 13, and 14. Thus, article 600 has been placed in proximity to a source of steam 1600. In one embodiment, holes 1520 in steaming source 1500 can allow steam to enter into chamber 200 and subject article 600 to a steam environment within chamber 200. As illustrated in FIG. 21, steam 1600 can enter from steaming source 1500 through throat opening 606 and into interior 2100 of article 600 in some embodiments. Steaming source 1500 may be placed onto a bottom portion 2150 of container 100 in any position. Thus, in one embodiment, steam 1600 is able to move or flow around the interior void of an article of footwear. Furthermore, as shown in FIG. 22, steam 1600 can flow directly to regions of upper 602 extending from heel portion 645 to forefoot portion 605. In FIG. 22, steam 1600 flows from holes 1520 and into interior 2100 through throat opening 606. In addition, steam 1600 moves toward and contacts portions of upper 602 associated with collar portion 604, vamp portion 608, and toe portion 612. This direct application of steam 1600 along both an outer surface 2210 of upper 602 and an inner surface 2220 of upper 602 (defining interior 2100) can improve the customization process in some embodiments. For example, by providing steam 1600 to both outer surface 2210 and inner surface 2220 there can be a more even or uniform exposure of the upper materials to the steam. In addition, through the movement of steam 1600 throughout interior 2100, some portions of inner surface 2220 associated with exposed portion 1470 can also be exposed to steam, such as an insole for example, or inner surface 2220 of exposed upper 1480.

Furthermore, in some embodiments, articles can be configured with one or more customizable portions. The term "customizable portion" as used throughout this detailed description refers to a portion with characteristics that can be customized. Examples of such characteristics include, but are not limited to, size, shape, material properties (such as rigidity and/or flexibility) as well as other properties. In one embodiment, a customizable portion may be a portion with a size and/or shape that can be adjusted. In addition, in some cases, the material properties of a customizable portion could also be adjusted.

The characteristics of customizable portions can be varied in different ways. In some embodiments, a customizable portion can be varied through a curing process. In other words, the customizable portion may be heated above a predetermined temperature and modified before cooling the customizable portion so that the modifications are retained. In other embodiments, the characteristics of customizable portions can be varied through the use of pressure, chemical additives or other known methods of changing the characteristics of material including the size, shape, rigidity, flexibility, and/or other properties. In still other embodiments, a combination of heat, pressure, and/or chemicals could be used to modify the customizable portion.

Generally, an article as discussed herein in relation to steaming apparatus 120 can comprise one or more customizable portions. In some embodiments, an upper may be associated with one or more customizable portions. In other embodiments, one or more layers of a sole structure may be associated with one or more customizable portions. In other cases, a customizable portion may be associated with any combination of different portions of an upper and sole structure or other portions of an article of footwear. In particular, the customizable portions may extend through a substantial majority of an upper and/or an insole. Using this arrangement, articles can be custom shaped to the specific geometry of the foot of a user to enhance comfort and fit in different embodiments.

In order to modify any customizable portions, an article may be heated above a predetermined temperature. For example, in embodiments where a customizable portion may transition between a crystalline phase and a liquid-like phase, the predetermined temperature can be a glass transition temperature. In some cases, the glass transition temperature is useful in characterizing amorphous solids such as plastics or similar materials that may not have a true melting point. However, in other cases, the predetermined temperature can be some other temperature at which a customizable portion may become substantially more deformable. In some cases, articles may be placed in an oven. In other cases, articles may be heated using steam. In one embodiment, articles may be heated in any steam environment. A steam environment can be created in different ways. In some cases, a steam environment can be created using steaming apparatus 120. Thus, by selecting materials for an article of footwear that become substantially more deformable at temperatures less than or equal to the temperature of steam, a customizable portion can be activated by applying steam to an article of footwear using steaming apparatus 120.

In embodiments where the article to be customized comprises an article of footwear, a range of footwear sizes may be used within steaming apparatus 120. For example, in some embodiments, chamber 200 and/or receiving aperture 500 may be large enough to accommodate footwear between standard US shoe sizes 0-17. In another embodiment, steaming apparatus 120 may be used with footwear greater than a US size 17. Furthermore, the arrangement of the flanges may facilitate the stable placement of articles of various sizes in receiving aperture 500, as discussed above.

In some embodiments, the desired duration of exposure to steam 1600 may be determined by the user and/or the preferences of the user. In other embodiments, the duration may be recommended by the manufacturer. The duration of time may vary and allows the article of footwear to be exposed to a steam environment for a sufficient amount of time to become moldable. In some cases, the duration of time may vary depending on the type of article of footwear. In other cases, the duration of time may vary depending on the size of the article of footwear or may be the same for all types of articles of footwear. In some cases, the duration of exposure of the article to the steam environment may be between 20 seconds and 5 minutes. For example, when steaming articles that comprise various materials, the articles may require a greater—or lesser—length of exposure time to steam in order to achieve the pliability necessary for customization. In another embodiment, the materials used in the articles may be relatively more delicate, and a shorter exposure may be desired.

It should be understood that in different embodiments, steaming apparatus 120 may be operated by any person configured (i.e., trained) to operate the apparatus. Furthermore, in order to facilitate the use of steaming apparatus 120, the system may include provisions for instructing a user about how to operate steaming apparatus 120. In one embodiment, steaming apparatus 120 can include a set of instructions. Generally, the instructions can be supplied in any format. In some cases, there may be a printed copy of instructions, such as a booklet or a digital storage device. In other embodiments, instructions may be located on container 100. In one embodiment, an interior side or outer side (see FIG. 2) of lid 110 may include a set of instructions that are resistant to damage from moisture. This may facilitate the use of steaming apparatus 120 by individuals who are unfamiliar with the operation of steaming apparatus 120 and can allow the system to be used relatively quickly (i.e., within a short period of time) by most laypeople.

In different embodiments, steaming apparatus 120 may include provisions for rapidly evacuating steam 1600 from the system. As depicted in the figures, the configuration of container 100 and lid 110 may allow for the prompt release of steam 1600 in a short period of time after steaming of an article is accomplished. In one embodiment, the rapid evacuation of steam 1600 may allow a user to easily access chamber 200 soon after the lifting of lid 110. This feature may further facilitate the use of steaming apparatus 120 by quickly lowering the temperature of container 100 in order to allow the handling of the apparatus by a person and/or prepare the apparatus for use with a second (or additional) article. In situations where steamed articles are needed quickly (e.g., for players to use before a game), this feature may be significant. Thus, it should be understood that steaming apparatus 120 may be used for steaming at least two articles of footwear in some embodiments, wherein a first article may be inserted into the steaming apparatus, steamed, and removed, followed by at least a second article that may be subsequently inserted into the steaming apparatus, steamed, and removed.

Figure 23:
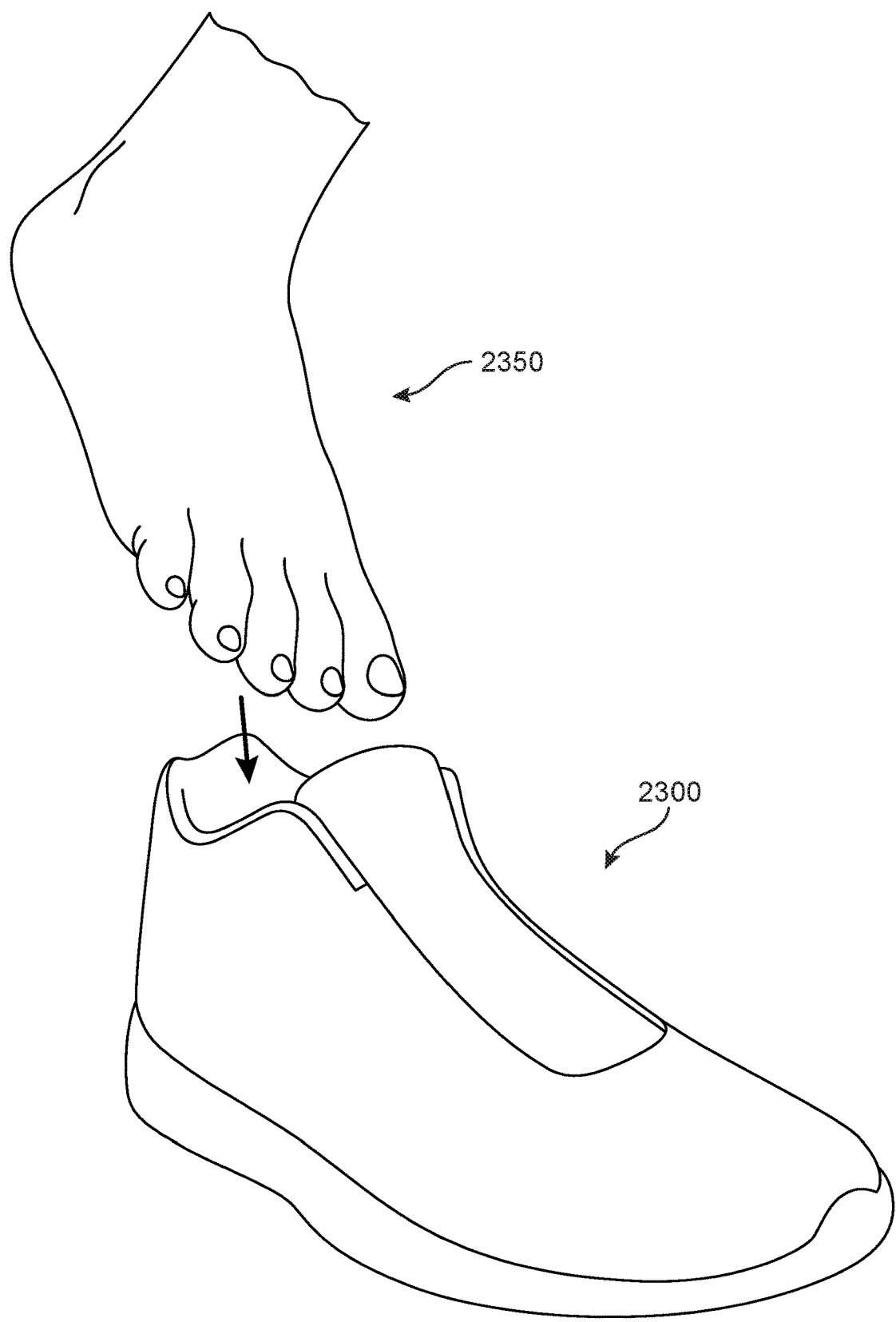
FIG. 23 is an isometric lateral view of a foot being inserted into an article of footwear.
Figure 24:
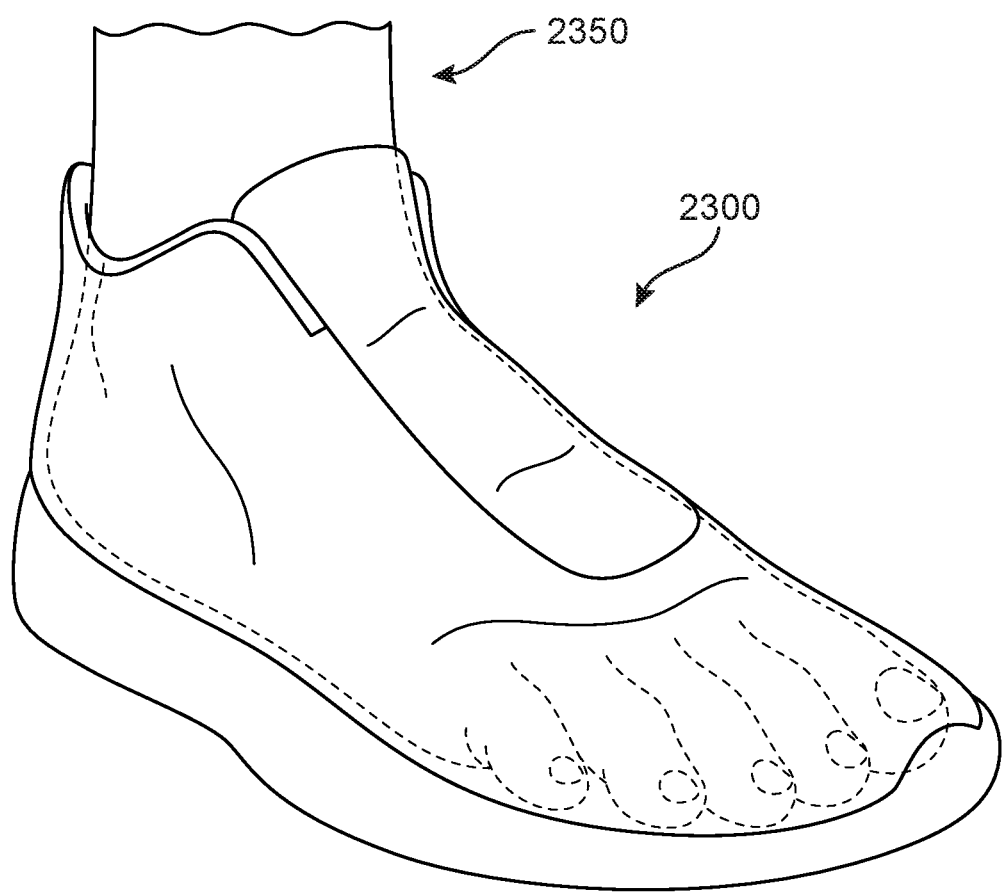
FIG. 24 is an isometric lateral view of a foot in an article of footwear.
Figure 25:
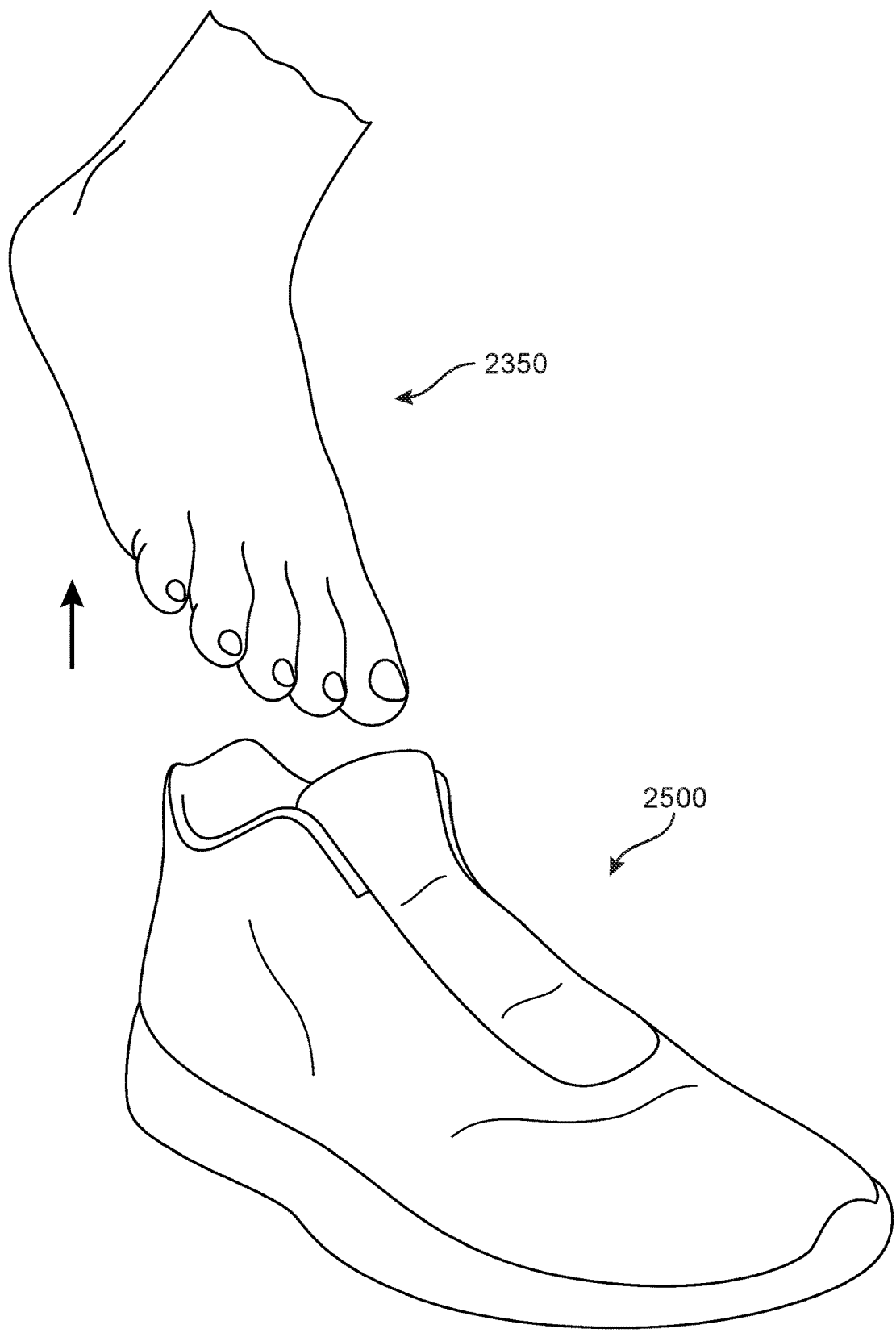
FIG. 25 is an isometric lateral view of a foot being removed from an article of footwear.

FIGS. 23-25 illustrate an embodiment of a method of custom fitting an article of footwear. For purposes of illustration, FIGS. 23-25 illustrate an embodiment of a method of custom fitting an article of footwear using the post-manufacturing customization system of steaming apparatus 120. Referring to FIG. 23, a steamed article of footwear ("steamed article") 2300 is shown that has been subjected to a steam environment according to the disclosed embodiments. As illustrated in FIG. 23, steamed article 2300 has been removed from the steaming apparatus and is readied for a foot 2350 to be inserted into steamed article 2300 to initiate the individual customization process.

Referring to FIG. 24, an embodiment of custom fitting steamed article 2300 to foot 2350 is shown. As illustrated in FIG. 24, foot 2350 is inserted into steamed article 2300, where foot 2350 is depicted in dotted line. In some cases, a foot may be kept inside the article of footwear for a predetermined amount of time sufficient to allow the article of footwear to conform to the shape and contours of the foot. The article of footwear can be composed of a moldable material or customizable portions that can stretch or shrink to assume a customized shape. The moldable material allows the article of footwear to be custom fitted to a foot as the article of footwear cools. The moldable material may be any material that becomes pliable at an elevated temperature and is capable of retaining a shape as it cools. In some embodiments, the moldable material may be synthetic leather. In some cases, the article of footwear may contain multiple moldable materials with different properties, including, but not limited to, pliability, temperature at which it becomes moldable, hardness, as well as other characteristics.

FIG. 25 illustrates the steamed article of FIGS. 23 and 24 as a customized article of footwear ("customized article") 2500 that has been custom fitted to foot 2350. As illustrated in FIG. 25, customized article 2500 substantially retains its shape and contours molded from contact with foot 2350 after the foot is removed from the article of footwear. The method of custom fitting an article of footwear results in customized article 2500 that closely fits the shape and contour of the foot that was inserted in the article of footwear while it cooled.

Figure 26:
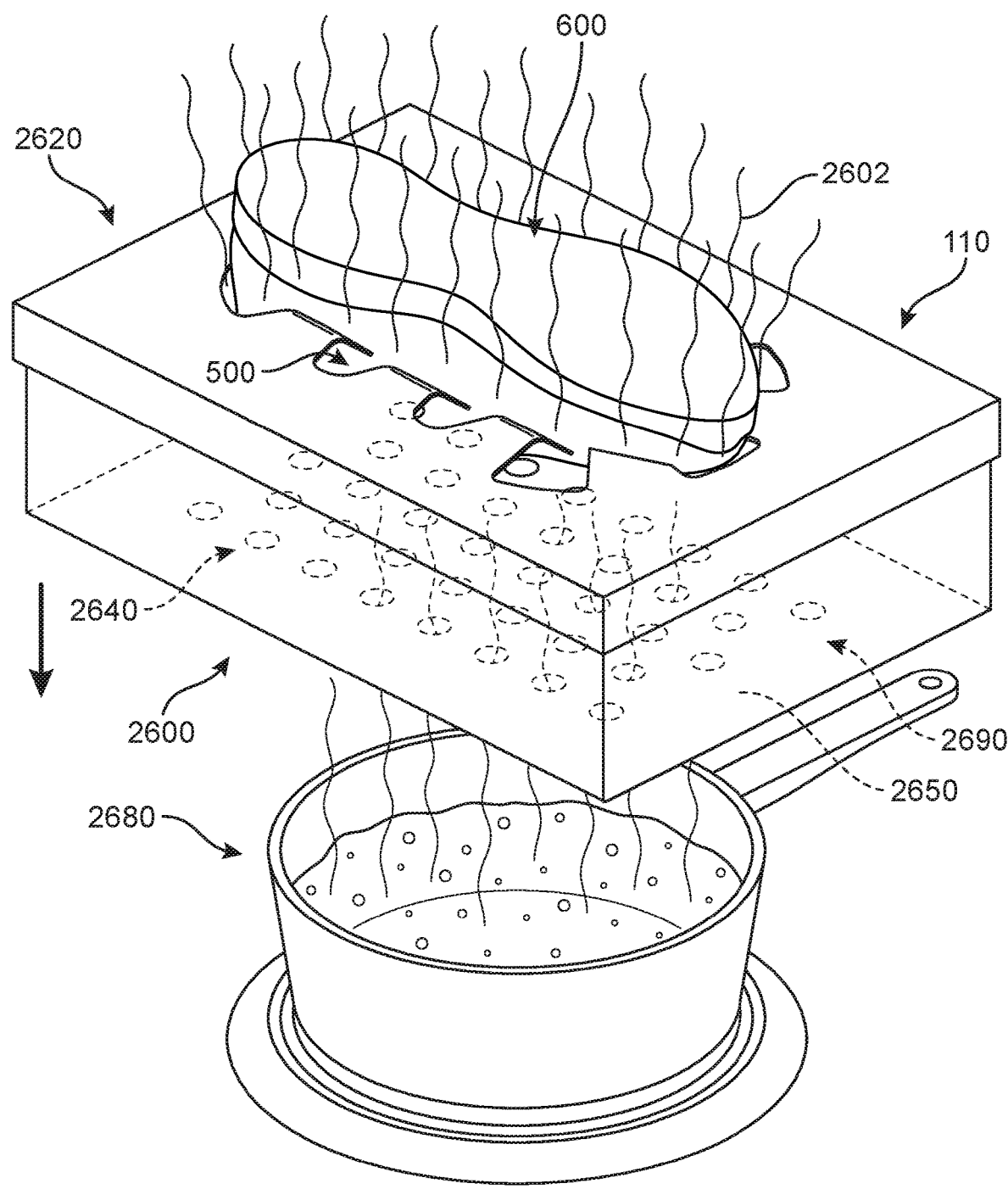
FIG. 26 is an isometric view of an embodiment of a steaming system with an article of footwear.

Other embodiments of the steaming system can include additional features to facilitate the use of steaming system. For example, referring to FIG. 26, a second steaming system 2620 is shown. Second steaming system 2620 is similar to steaming system 120 of FIG. 1 whereby article 600 can be disposed and secured in receiving aperture 500 formed in lid 110. Article 600 can be inserted above the interior chamber of the container in a position substantially similar to that depicted in FIGS. 6, 10, 12, and 20. However, in the embodiment of FIG. 26, lid 110 is mounted on a second container 2600. Second container 2600 includes a base portion 2650 that is provided with holes 2640 for allowing steam to enter into second container 2600. It should be understood that, in different embodiments, holes 2640 can be arranged in a variety of patterns along base portion 2650. In some embodiments, holes 2640 can be arranged to form a generally circular, square, triangular, or other regular or irregularly shaped arrangements. In some embodiments, holes 2640 can be arranged to substantially match or align with a likely steam source. In FIG. 26, holes 2640 are formed in a generally rectangular arrangement along base portion 2650.

In some cases, base portion 2650 may be perforated to facilitate easy removal of material to form holes 2640. In other cases, base portion 2650 may be scored in some regions. In other embodiments, base portion 2650 may be marked by dotted or dashed lines for removal by a customer. In one embodiment, the holes may be made removable by applying a force to "punch out" or pull the material associated with the holes.

Furthermore, in the embodiment of FIG. 26, it can be seen that second steaming system 2620 can be positioned over a source of steam comprising a pot 2680 containing boiling water. In other words, the steam source is now external to the container and is not disposed within the chamber, in contrast to the previous embodiments. In other cases, a source of steam may be provided by introducing water to a heat source, including, but not limited to: a microwave, an oven, a stovetop, a heating coil, as well other sources of steam, and positioning the steaming system above the steam source.

As illustrated in FIG. 26, steam 2602 is able to enter from pot 2680 into the interior of second container 2600 through holes 2640. In one embodiment, holes 2640 may be configured to allow fluid communication between the source of steam associated with pot 2680 and an interior chamber 2690 of second container 2600. In some embodiments, holes 2640 formed on bottom portion 2650 can allow steam 2602 to enter into chamber 2690 and subject article 600 to a steam environment within chamber 2690. Once steam 2602 enters the container, the steam is able to move or flow around the interior void of an article of footwear in a manner similar to that described above with respect to FIGS. 20-22. Thus, in some embodiments, article 600 can be placed in proximity to pot 2680 that is located external with respect to steaming system 2620.

In different embodiments, the steaming apparatus as described herein may be capable of producing articles of footwear that are customizable to a user's foot. Moreover, the production of the steamed articles can occur relatively quickly, and may be as short as the combined time needed to ready a steaming source, inserting the steaming source in the container, inserting an article into the receiving aperture, waiting for a preferred duration of time, and removing the article. Although the time required for each step could vary in different embodiments, embodiments could provide a total time of less than 5 minutes. In at least some embodiments, the time required for each step may be selected so that the total customization time (including the fitting to a user's foot) is between 15 and 30 minutes. In still further embodiments, the total customization time is less than 15 minutes.

Thus, a steaming apparatus may include provisions for facilitating the customization of articles in different environments and locations. For example, in situations where frequent "breaking-in" of apparel is needed (e.g., sports players who may use over 7-12 pairs of articles of footwear each season) the steaming apparatus may provide increased convenience, as well as great utility, by allowing players to have articles quickly steamed for customization soon before a match or sporting event. In another embodiment, some users may have injuries or conditions that require the use of specialized ankle or footwear support. Other users may appreciate the convenience of customization that can occur at their own home, or in a location of their choosing. Furthermore, in some embodiments, the articles selected for customization may be purchased within the same shoebox as the steaming apparatus, providing consumers with a kit that is portable and efficient. The use of the steaming apparatus can easily allow the user to steam his or her respective footwear and then insert his or her foot (while wearing the footwear support) into steamed articles to help achieve an improved fit within a few minutes, and at a convenient location.

This description of features, systems, and components is not intended to be exhaustive and in other embodiments, the steaming apparatus may include additional features, systems, and/or components. Moreover, in other embodiments, some of these features, systems, and/or components could be optional.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A steaming apparatus comprising:
a shoebox comprising a container and a lid, the lid being sized and dimensioned to fit onto and cover the container to form an interior chamber sized to hold a pair of articles of footwear;
wherein the interior chamber is configured to receive and hold a steam source;
wherein the lid comprises a flat center portion having a removable area defined therein, the removable area configured to be fully removed from the lid so as to form, after removal, an aperture in the lid;
wherein the aperture is sized and dimensioned to receive a substantial majority of an upper, of an article of footwear of the pair of articles of footwear, from a forefoot portion to a heel portion of the upper;
wherein the aperture comprises an outer perimeter defining a plurality of tapered flanges extending toward a center of the aperture and separated by open spaces between the flanges, the open spaces defining a portion of the outer perimeter, wherein each of the flanges comprises a rounded tip;
wherein the flanges, when in a neutral state in which no external force has been applied to the lid, are flat and aligned with a remainder of the center portion of the lid; and
wherein the flanges, upon placement of the upper into the aperture, are deformable into the interior chamber and configured to securely hold the article of footwear in an inverted position;
wherein the shoe box is configured such that, when steam is released from the steam source, the upper in the inverted position is exposed to steam, and steam further escapes through the open spaces between the flanges.

2. The steaming apparatus of claim 1, wherein the plurality of flanges comprises nine flanges.

3. The steaming apparatus of claim 1, wherein the aperture is configured to receive the article of footwear such that a throat opening, an instep portion, and a toe portion of the upper of the article of footwear are disposed within the interior chamber when the article of footwear is inserted through the aperture, and such that a first subset of multiple flanges of the plurality of flanges support a lateral side of the upper and a second subset of multiple flanges of the plurality of flanges support a medial side of the upper.

4. The steaming apparatus of claim 3, wherein the plurality of flanges comprises nine flanges, and wherein the aperture is configured to receive the article of footwear such that each of the nine flanges contacts the upper when the article of footwear is inserted into the aperture in the inverted position.

5. The steaming apparatus of claim 1, wherein the removable area in the lid includes a perforated outer perimeter.

6. The steaming apparatus of claim 1 comprising:
the pair of articles of footwear;
wherein an interior surface of the interior chamber is substantially steam resistant;
wherein each of the articles of footwear includes a forefoot portion, a midfoot portion, and a heel portion; and
wherein each of the articles of footwear includes an upper and a sole structure.

7. The steaming apparatus of claim 1, wherein the aperture is substantially symmetrical along a central longitudinal axis of the lid.

8. The steaming apparatus of claim 1, wherein the aperture is sized and dimensioned to receive the upper from the heel portion of the upper to a toe portion of the upper.

9. A method of using a steaming apparatus for steaming an article of footwear, the steaming apparatus comprising a shoebox comprising a container and a lid, and the lid being sized and dimensioned to fit onto and cover the container to form an interior chamber sized to hold a pair of articles of footwear that includes the article of footwear, the article of footwear comprising an upper and a sole structure, and the article of footwear including a forefoot portion, a midfoot portion, and a heel portion, the method comprising:
forming an aperture in a flat center portion of the lid by removing a removable portion of material, the aperture being sized and dimensioned to receive a substantial majority of the upper, an outer perimeter of the aperture defining a plurality of tapered flanges extending toward a center of the aperture and separated by open spaces between the flanges the open spaces defining a portion of the outer perimeter, wherein each of the flanges comprises a rounded tip, wherein the flanges, in a neutral state in which no external force has been applied to the lid, are flat and aligned with a remainder of the center portion of the lid;
inserting the upper into the aperture in an inverted position, wherein the flanges contact the upper along the forefoot portion, the midfoot portion, and the heel portion and hold the upper in place in the inverted position within the aperture, and wherein the flanges deform into the interior chamber after insertion of the upper into the aperture; and
wherein at least a collar portion, a throat opening, and a vamp portion of the upper are disposed within the interior chamber after insertion of the upper into the aperture; and
exposing the upper to steam inside the interior chamber; wherein steam further escapes through the open spaces between the flanges.

10. The method of claim 9, wherein the source of steam is positioned underneath the upper inside the interior chamber.

11. The method of claim 9, further comprising removing the article of footwear from the aperture and cooling the article of footwear while the article of footwear is being worn by a foot.

12. The method of claim 9, wherein the step of forming the aperture further comprises applying a force along the removable portion, wherein the removable portion of material has a perforated outline corresponding to the outer perimeter of the aperture.

13. The method of claim 9, further comprising removing the pair of articles of footwear from the container.

14. The method of claim 9, wherein the sole structure remains outside of the interior chamber when the upper is inserted into the aperture.

15. The method of claim 11, further comprising inserting an upper of a second article of footwear of the pair into the aperture and steaming the second article of footwear.

16. The method of claim 9, further comprising subjecting the article of footwear to the source of steam until the article of footwear becomes moldable.

17. The method of claim 9, wherein the source of steam is positioned underneath the steaming apparatus when the upper is inserted into the aperture.

18. The steaming apparatus of claim 1, wherein the container comprises a base portion, wherein the base portion is perforated or scored to define a plurality of regions removable to form holes in the base portion.

* * * * *